US008814087B2

(12) United States Patent
Koschberg et al.

(10) Patent No.: US 8,814,087 B2
(45) Date of Patent: Aug. 26, 2014

(54) INTERFACE SYSTEM FOR USE IN AN AIRCRAFT GALLEY

(75) Inventors: Stefan Koschberg, Ostseebad Nienhagen (DE); Marco Mundt, Heiligengrabe (DE); Detlef Eggers, Papendorf (DE)

(73) Assignee: Airbus Operations GmbH, Hamburg (DE)

( * ) Notice: Subject to any disclaimer, the term of this patent is extended or adjusted under 35 U.S.C. 154(b) by 367 days.

(21) Appl. No.: 13/376,736

(22) PCT Filed: Jun. 8, 2010

(86) PCT No.: PCT/EP2010/003432
§ 371 (c)(1),
(2), (4) Date: May 8, 2012

(87) PCT Pub. No.: WO2010/142420
PCT Pub. Date: Dec. 16, 2010

(65) Prior Publication Data
US 2012/0217343 A1    Aug. 30, 2012

Related U.S. Application Data

(60) Provisional application No. 61/184,941, filed on Jun. 8, 2009.

(30) Foreign Application Priority Data

Jun. 8, 2009   (DE) .................. 10 2009 024 210

(51) Int. Cl.
*B64D 11/04*   (2006.01)
*B64D 11/00*   (2006.01)
*B64D 13/00*   (2006.01)

(52) U.S. Cl.
CPC . *B64D 11/04* (2013.01); *Y02T 50/46* (2013.01)
USPC ...................................... 244/118.5

(58) Field of Classification Search
USPC ............................ 244/118.5, 118.1
See application file for complete search history.

(56) References Cited

U.S. PATENT DOCUMENTS

| | | | |
|---|---|---|---|
| 4,562,978 A | | 1/1986 | Durbin et al. |
| 5,083,727 A | * | 1/1992 | Pompei et al. ............. 244/118.6 |

(Continued)

FOREIGN PATENT DOCUMENTS

| | | |
|---|---|---|
| DE | 102006023047 | 11/2007 |
| EP | 1551709 | 3/2006 |

(Continued)

OTHER PUBLICATIONS

European Patent Office, International Search Report, Form PCT/ISA/210 (4 pgs.), Form PCT/ISA/220 (3 pgs.), and Written Decision of The International Search Authority, Form PCT/ISA/237 (6 pgs.), Oct. 28, 2010.

*Primary Examiner* — Philip J Bonzell
(74) *Attorney, Agent, or Firm* — Wood, Herron & Evans, LLP

(57) ABSTRACT

An interface system for use in an aircraft galley includes a first connection element. The first connection element can be connected via a first appliance connection apparatus to an internal electrical system, an internal fresh water supply system, and an internal wastewater disposal system of a first galley appliance, and can be connected via a second appliance connection apparatus to an internal electrical system, an internal fresh water supply system, and an internal wastewater disposal system of a second galley appliance. Further, the first connection element can be connected via an aircraft galley connection apparatus to a complementary aircraft galley connection apparatus of a second connection element of the interface system. The second connection element can be fixed in a compartment in the aircraft galley, so as to connect the first connection element to an electrical system, a freshwater supply system and a wastewater disposal system.

15 Claims, 13 Drawing Sheets

(56) References Cited

U.S. PATENT DOCUMENTS

| | | | |
|---|---|---|---|
| 6,101,766 A * | 8/2000 | Mogensen | 52/34 |
| 6,227,101 B1 | 5/2001 | Rabadi et al. | |
| 7,780,114 B2 * | 8/2010 | Doebertin et al. | 244/118.5 |
| 7,913,950 B2 * | 3/2011 | Huber | 244/118.1 |
| 7,954,761 B2 * | 6/2011 | Johnson et al. | 244/118.5 |
| 2006/0060181 A1 * | 3/2006 | Sasaki et al. | 126/21 A |
| 2006/0145002 A1 * | 7/2006 | Van Loon | 244/118.1 |
| 2008/0001031 A1 | 1/2008 | Doebertin et al. | |
| 2008/0129159 A1 * | 6/2008 | Johnson et al. | 312/111 |
| 2009/0314889 A1 | 12/2009 | Baatz et al. | |

FOREIGN PATENT DOCUMENTS

| | | |
|---|---|---|
| WO | 2007096000 | 8/2007 |
| WO | 2008067428 | 6/2008 |

* cited by examiner

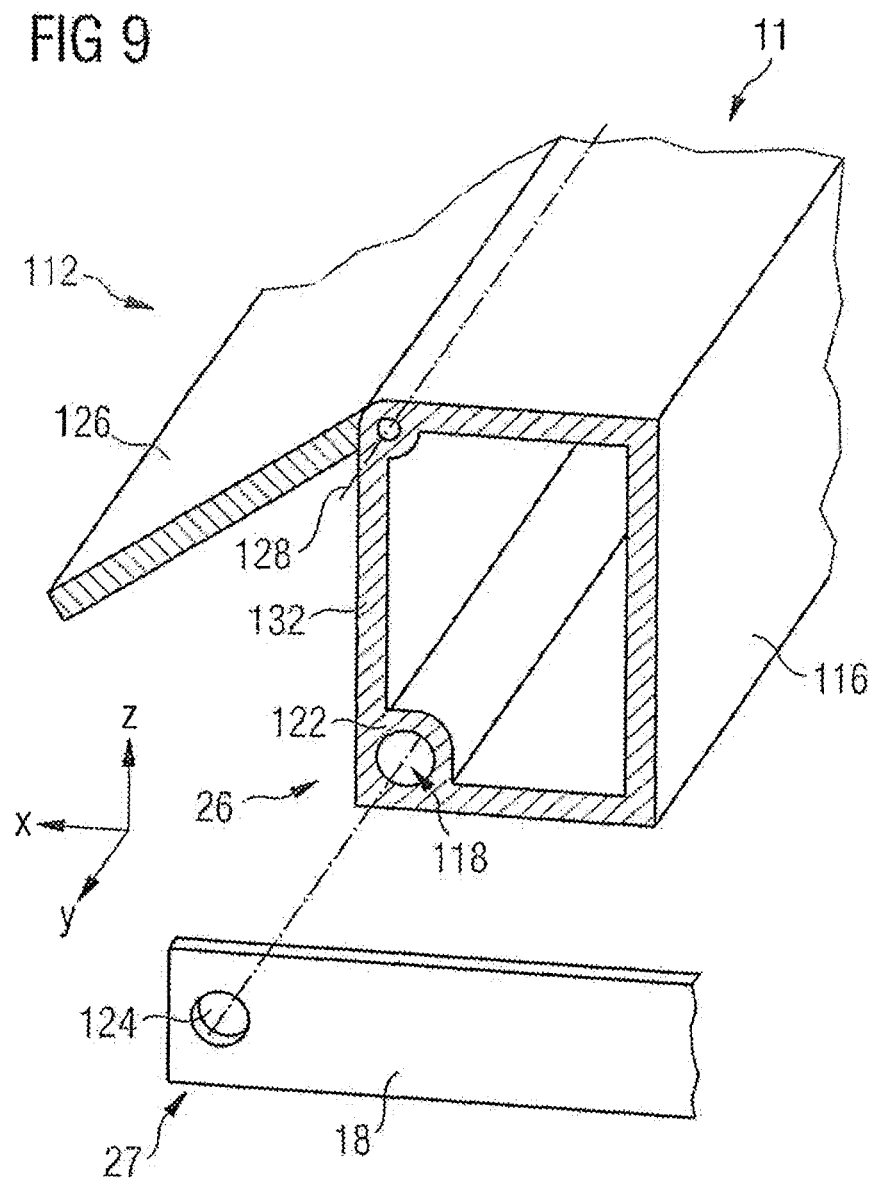

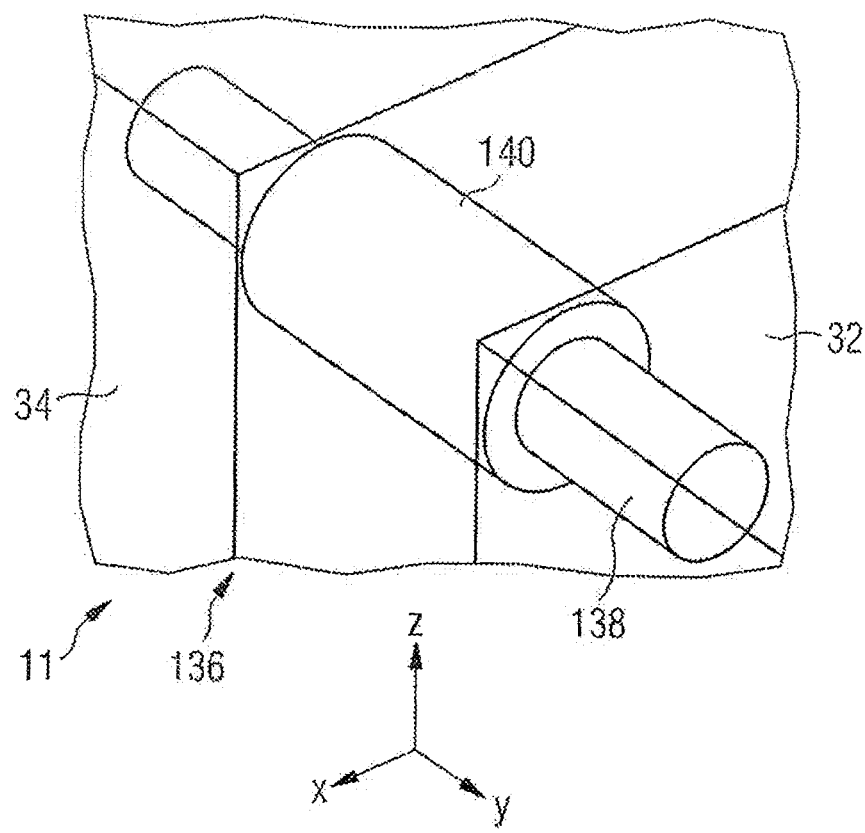

INTERFACE SYSTEM FOR USE IN AN AIRCRAFT GALLEY

This application claims priority under Section 371 and/or as a continuation under Section 120 to PCT Application No. PCT/EP2010/003432, filed on Jun. 8, 2010, which claims priority to German Application No. 10 2009 024 210.4 and U.S. Provisional Application No. 61/184,941, both filed on Jun. 8, 2009.

TECHNICAL FIELD

The present invention relates to an interface system provided for use in an aircraft galley, to an appliance module comprising such an interface system and provided for reception in an aircraft galley, and to a method for mounting galley appliances in an aircraft galley.

BACKGROUND

An aircraft galley of modular construction, comprising a base body with a plurality of compartments, is known from WO 2007/096000 A1. Various appliances, such as for example ovens, microwave ovens, water heaters and beverage makers, are arranged in the compartments of the base body. Further, a plurality of boxes arranged one behind the other are received in the compartments of the base body, in which boxes service products required for supplying to the passengers on board the aircraft, such as for example food or beverages, can be accommodated.

DE 10 2006 023 047 A1 discloses a modular aircraft galley with interface elements provided in compartments of the galley for connection of galley appliances to an electrical supply network and a water supply network of the galley.

SUMMARY

The object on which the invention is based is to provide an interface system which enables galley appliances to be installed in a compartment of an aircraft galley in a simple, space-saving and flexible manner. Further, the object on which the invention is based is to specify an appliance module comprising such an interface system and provided for reception in an aircraft galley. In addition, the object on which the invention is based is to specify a method for mounting galley appliances in an aircraft galley.

An interface system for use in an aircraft galley according to the invention comprises a first connection element which can be connected via a first appliance connection device to an internal electrical system, an internal freshwater supply system and/or an internal wastewater disposal system of a first galley appliance, and can be connected via a second appliance connection device to an internal electrical system, an internal freshwater supply system and/or an internal wastewater disposal system of a second galley appliance. The first connection element can further be connected via an aircraft galley connection device to a complementary aircraft galley connection device of a second connection element, which second connection element can be fastened in a compartment of an aircraft galley, in order to connect the first connection element via the second connection element to an electrical system, a freshwater supply system and/or a wastewater disposal system of the aircraft galley. The first connection element additionally comprises a distributor system which connects the aircraft galley connection device of the first connection element to the first and the second appliance connection device of the first connection element.

The interface system according to the invention makes it possible to establish via the first connection element in a simple manner a connection between the internal electrical system, the internal freshwater supply system and/or the internal wastewater disposal system of the first galley appliance and the electrical system, the freshwater supply system and/or the wastewater disposal system of the aircraft galley, and a connection between the internal electrical system, the internal freshwater supply system and/or the internal wastewater disposal system of the second galley appliance and the electrical system, the freshwater supply system and/or the wastewater disposal system of the aircraft galley. In other words, the interface system according to the invention ensures that the internal systems of a plurality of galley appliances can be connected in a simple manner to the corresponding systems of the aircraft galley.

In principle, at least two galley appliances can be connected to an electrical system, a freshwater supply system and/or a wastewater disposal system of the aircraft galley by means of the interface system according to the invention, it being possible for the galley appliances to be each connected to all three aircraft galley systems or to only one or two aircraft galley system(s), as required. For example, the connection of a galley appliance to a freshwater supply system and/or a wastewater disposal system of the aircraft galley can be dispensed with if the galley appliance during operation consumes no water and/or produces no wastewater and therefore comprises no internal freshwater supply system and/or no internal wastewater disposal system. Further, the interface system according to the invention can also be configured to connect more than two galley appliances to an electrical system, a freshwater supply system and/or a wastewater disposal system of the aircraft galley. For this purpose, the interface system merely has to have a corresponding number of appliance connection devices and a correspondingly designed distributor system.

The interface system according to the invention offers the possibility of connecting two or more galley appliances to the electrical system, the freshwater supply system and/or the wastewater disposal system of the aircraft galley via a single second connection element arranged in the compartment of the aircraft galley. The interface system according to the invention can therefore be employed particularly advantageously in already existing aircraft galleys, in which the second connection element was originally provided for supplying only a single galley appliance or in which only one second connection per compartment is provided, but it is required or desired to connect more than one galley appliance to the electrical system, the freshwater supply system and/or the wastewater disposal system of the aircraft galley without installing further second connection elements. As a result, the space available in an aircraft galley for receiving galley appliances can be utilised particularly well and with particular versatility.

The galley appliances can take the form, for example, of ovens, microwave ovens, toasters, water heaters, baby food preparation devices, hot beverage makers, water tanks, water dispensers, storage containers or the like. The intended use of the first galley appliance can be the same as or different to that of the second galley appliance. For example, the interface system can be configured to connect a galley appliance combination of a microwave oven and a hot beverage maker to the aircraft galley.

The second connection element of the interface system according to the invention can preferably be fastened in such a position in the compartment of the aircraft galley, and the first connection element can preferably be connected in such a position to the galley appliances, that the first connection element cooperates substantially automatically with the second connection element on the mounting of the galley appliances, connected to the first connection element, in the compartment of the aircraft galley. In other words, a plug-and-play system can be created by the interface system according to the invention, enabling the aircraft galley appliances to be mounted and put into operation in a particularly simple manner.

Further, with the aid of the interface system according to the invention, a plurality of galley appliances can be mounted in the aircraft galley in one operation, it being possible for mounting work for connecting the internal electrical systems, the internal freshwater supply systems and/or the internal wastewater disposal systems of the galley appliances to the first connection element to be carried out conveniently outside the aircraft galley. Finally, the interface system according to the invention enables the internal electrical connections, freshwater supply and/or wastewater disposal connections of the galley appliances to be uncoupled from the corresponding connections of the aircraft galley, so that the galley appliances can be mounted particularly flexibly at different positions in the aircraft galley.

The distributor system of the first connection element can comprise, for example, a current distributor, a freshwater distributor and/or a wastewater distributor. Preferably, the current distributor of the first connection element connects an electrical connection of the aircraft galley connection device of the first connection element to an electrical connection of the first appliance connection device of the first connection element and to an electrical connection of the second appliance connection device of the first connection element. Preferably, the freshwater distributor of the first connection element connects a freshwater connection of the aircraft galley connection device of the first connection element to a freshwater connection of the first appliance connection device of the first connection element and to a freshwater connection of the second appliance connection device of the first connection element. Preferably, the wastewater distributor of the first connection element connects a wastewater connection of the first appliance connection device of the first connection element and a wastewater connection of the second appliance connection device of the first connection element to a wastewater connection of the aircraft galley connection device of the first connection element.

The first connection element and in particular the distributor system of the first connection element can be variously designed. In one embodiment, the first connection element comprises a housing, on the side walls of which the aircraft galley connection device and the appliance connection devices can be arranged. The distributor system can then be integrated into the housing of the first connection element and the aircraft galley connection device can be directly connected to all the appliance connection devices of the first connection element.

Alternatively to this, however, the first connection element can also comprise an aircraft galley connection device which is directly connected to merely one appliance connection device or to merely some of the appliance connection devices. The distributor system of the first connection element is then preferably designed such that it connects the appliance connection device(s), directly connected to the aircraft galley connection device, to the appliance connection device(s) not directly connected to the aircraft galley connection device. The distributor system can then be integrated at least partly into a galley appliance which is provided for direct connection to the aircraft galley connection device via a corresponding appliance connection device. The interface system according to the invention can thus be adapted particularly well to different spatial arrangements and functional combinations of the galley appliances.

The current distributor of the first connection element can comprise, for example, electrical lines, cables, electronics boards, circuits or the like. Preferably, the current distributor of the first connection element feeds the electrical energy drawn from the electrical system of the aircraft galley separately into the galley appliances in accordance with the energy consumed by the galley appliances. In this case, the first connection element can be configured to ensure that a preset maximum of total electrical power consumed by the galley appliances is not exceeded.

The freshwater distributor of the first connection element can comprise, for example, water conduits in the form of pipes or hoses, flanges, sleeves, bent pipe sections, T-shaped distributor pieces, Y-shaped distributor pieces, seals, channels, valves, flaps, flow-regulating valves, nonreturn valves, leakage rupture protection couplings, pipe couplings or the like. Preferably the freshwater distributor feeds the fresh water separately into the galley appliances in accordance with the amount of water consumed by the galley appliances.

Likewise, the wastewater distributor of the first connection element can comprise water conduits in the form of pipes or hoses, flanges, sleeves, bent pipe sections, T-shaped distributor pieces, Y-shaped distributor pieces, seals, channels, valves, flaps, flow-regulating valves, nonreturn valves, leakage rupture protection couplings or pipe couplings. The wastewater distributor of the first connection element draws wastewater from the galley appliances and leads the wastewater away into the wastewater system of the aircraft galley. The wastewater distributor can also be designed, for example, in such a way that it connects the wastewater connections of the first and the second appliance connection device of the first connection element to a wastewater storage tank for intermediate storage of wastewater.

In a preferred embodiment of the interface system according to the invention, the freshwater connections of the first and the second appliance connection device of the first connection element are arranged in a first section of the first connection element, while the wastewater connections of the first and the second appliance connection device of the first connection element are arranged in a second section of the first connection element formed separately from the first section of the first connection element. The first and the second section of the first connection element can then be connected to the galley appliances in different positions. It is thereby possible to utilise the gravitational force on feeding fresh water to and/or discharging wastewater from the galley appliances. For example, the first section of the first connection element can be provided for mounting in an upper section of the galley appliances and the second section of the first connection element can be provided for mounting in a lower section of the galley appliances.

Additionally or alternatively to this, it is conceivable to arrange the electrical connections of the first and the second appliance connection device of the first connection element in a section of the first connection element which is formed separately from a section of the first connection element for receiving the freshwater connections and the wastewater connections of the first and the second appliance connection device of the first connection element. This enables a spatial separation of electrical connections and water connections and thus prevents an electrical short-circuit from being caused in the event of a leak of a water connection.

Preferably, the interface system according to the invention comprises a connecting device which secures the first and the second galley appliance in their position relative to one another. The connecting device can be configured to be connected to the galley appliances by screwing or adhesive bonding or by means of a plug-in connection. With the aid of the connecting device of the interface system according to the invention, the galley appliances can be preassembled to form an independently handleable assembly before they are mounted in the compartment of the aircraft galley.

In a preferred embodiment of the interface system according to the invention, the connecting device comprises a carrier structure which is configured to receive the first and the second galley appliance. The carrier structure can have a basic shape adapted to the shape of the compartment of the aircraft galley in which the galley appliances are to be mounted. For example, the basic shape of the carrier structure can be of cuboid-shaped design. Preferably, the width of the carrier structure is adapted to the width of the compartment of the aircraft galley, so that the galley appliances can be securely mounted in the compartment of the aircraft galley. If desired, the height and/or the depth of the carrier structure basic shape can additionally also be adapted to the height and/or depth of the compartment of the aircraft galley. This ensures optimal utilisation of the installation space available for galley appliances in the aircraft galley.

The carrier structure of the interface system according to the invention can comprise, for example, a plurality of struts. A carrier structure formed substantially by struts can be realised to be particularly lightweight. In order to give the carrier structure the required stiffness, the carrier structure can comprise for example, besides horizontal and vertical struts defining lateral surfaces of the for example cuboid-shaped basic shape of the carrier structure, stiffening diagonal struts. The struts of the carrier structure can be connected to the galley appliances in any suitable manner. For example, the struts of the carrier structure can be screwed to the galley appliances. The struts of the carrier structure can, if desired, also be formed as hollow struts. As a result, the weight of the carrier structure can be further reduced. Moreover, if necessary, the struts can receive electrical lines and/or water conduits or even serve as water-carrying conduits themselves.

Alternatively or additionally to the carrier structure, the connecting device of the interface system according to the invention can comprise a section of a housing of the first connection element to which the first and the second galley appliance can be fastened. For example, the housing section of the first connection element can be a strengthened housing section to which the galley appliances can be screwed or adhesively bonded. Further, the aircraft galley connection device of the first connection element can be arranged in the region of the housing section of the first connection element. If desired or required, the housing of a galley appliance or the housings of the galley appliances can have a recess, adapted to the shape of the housing of the first connection element, for receiving the housing of the first connection element.

Preferably, the connecting device of the interface system according to the invention further comprises a holding device which comprises one or more connecting pin(s) which can be connected to the first and the second galley appliance and one or more spacer(s) carried by the connecting pin(s). The connecting pin can be connected to the galley appliances, for example, by plugging-in, adhesive bonding or screwing. The holding device enables two adjacent galley appliances to be connected to one another while maintaining a distance between the adjacent galley appliances which is preset by the spacer. It is thus possible with the aid of the holding device to realise, for example, safety, cooling and/or ventilating gaps between the galley appliances.

In a preferred embodiment of the interface system according to the invention, the connecting device further comprises a holding strut. The first and the second galley appliance can be fastened to the holding strut in such a way that the holding strut is arranged in the region of a front side, accessible to a user, of the first and the second galley appliance and extends substantially parallel to the bottom plate of the compartment, when the first and the second galley appliance are mounted in the compartment of the aircraft galley. In the state of the galley appliances when mounted in the compartment of the aircraft galley, the holding strut can extend, for example, in the region of a lower edge of the compartment along the front side of the galley appliances over the entire width of the compartment. The holding strut can be formed, for example, as an L-profile, a U-profile or a hollow body, but in particular as a cuboid-shaped hollow body. Further, the holding strut can have a strengthened section to which the galley appliances can be connected by screwing, adhesive bonding or another connecting technique.

Finally, the connecting device can comprise a fixing plate. The first and the second galley appliance can be fastened to the fixing plate in such a way that the fixing plate is arranged in the region of lateral surfaces of the first and the second galley appliance facing a lateral surface of the compartment, when the first and the second galley appliance are mounted in the compartment of the aircraft galley. In other words, when the first and the second galley appliance are mounted in the compartment of the aircraft galley, the fixing plate can be arranged between a lateral surface of the compartment and lateral surfaces of the galley appliances opposite this lateral surface and can extend parallel to these surfaces. A fixing plate enables in particular the connection of two galley appliances, of which the first, in the state when mounted in the compartment of the aircraft galley, is arranged in the upper region of the compartment, while the second galley appliance is arranged below the first galley appliance in a lower region of the compartment. The fixing plate can be formed, for example, as a continuous plate, as a stiffening structure or as a grid or comprise a plurality of struts and can be fastened to the galley appliances by screwing or adhesive bonding.

A further preferred embodiment of the interface system according to the invention comprises a mounting system with a first and a second mounting device. The first mounting device can be fastened to the first and/or the second galley appliance directly or indirectly, for example via a carrier structure of the connecting device. The second mounting device, which is complementary to the first mounting device, can be configured to be fitted in the compartment of the aircraft galley and cooperate with the first mounting device, in order to secure the first and the second galley appliance in their position relative to the compartment of the aircraft galley. In such a design of a mounting system, the galley appliances can be conveniently connected to the first mounting device outside the compartment of the aircraft galley. In a separate operation, the second mounting device can be fitted in the compartment of the aircraft galley. Finally, the galley appliances can be introduced into the compartment of the aircraft galley and fastened in the compartment of the aircraft galley through the cooperation of the first mounting device attached to the galley appliances with the second mounting device fastened in the compartment of the aircraft galley. The galley appliances can thereby be reliably prevented from unintentionally moving from their intended position or falling out of the compartment of the aircraft galley.

Preferably, the first mounting device of the mounting system comprises a first guide rail which is configured to cooperate with a second guide rail of the second mounting device on the mounting of the galley appliances in the compartment of the aircraft galley and when the galley appliances are mounted in the compartment of the aircraft galley. On the mounting of the galley appliances in the compartment of the aircraft galley, the first guide rail of the first mounting device can, for example, be displaceably received in the second guide rail of the second mounting device. The galley appliances can then be introduced into the compartment of the aircraft galley in a simple manner by pushing in. The first mounting device preferably comprises two first guide rails which can extend substantially parallel to one another and parallel to a longitudinal axis of a galley appliance or the galley appliances in the state when fastened to the galley appliance(s). Similarly, the second mounting device can comprise two second guide rails which can extend substantially parallel to one another and parallel to a longitudinal axis of the compartment in the state when mounted in the compartment of the aircraft galley.

The second guide rail(s) of the second mounting device can, for example, be fastenable to an outer border of a bottom plate of the compartment of the aircraft galley. Alternatively to this, the second guide rails(s) of the second mounting device can also be attachable to a side wall of the aircraft galley compartment, the second guide rail(s) of the second mounting device then preferably being attachable in a lower region of the side wall of the aircraft galley compartment facing the bottom plate of the aircraft galley compartment. The arrangement of the first guide rails(s) of the first mounting device on the first and/or second galley appliance(s) connected to the interface system according to the invention is preferably adapted to the position of the second guide rail(s) of the second mounting device in the compartment of the aircraft galley. A particularly simple mounting of the galley appliances in the compartment of the aircraft galley is possible when two first guide rails of the first mounting device are attached, for example, to mutually opposite lateral surfaces of the galley appliances facing side walls of the aircraft galley compartment in the state of the galley appliances when arranged in the compartment of the aircraft galley. Two complementary guide rails of the second mounting device are then preferably fastened, at a corresponding height, to the bottom plate or the side walls of the compartment of the aircraft galley.

The mounting system further comprises a guide projection which extends from the first connection element or from a fixing device for fixing the second connection element in the compartment of the aircraft galley. The guide projection is configured to be received in a guide opening complementary to the guide projection and formed in the fixing device for fixing the second connection element in the compartment of the aircraft galley or in the first connection element, when the galley appliances are mounted in the compartment of the aircraft galley. The reception of the guide projection in the guide opening ensures secure positioning of the galley appliances in the compartment of the aircraft galley. At the same time, the first and the second connection element are also correctly aligned with one another, so that the first and the second connection element can be more or less automatically connected to one another as soon as the galley appliances have reached the desired position in the aircraft galley compartment. The guide projection can be formed, for example, by a cylindrical or U-profile-shaped body. Similarly, the guide opening can be formed by a substantially cylindrical recess or designed as a U-profile-shaped guide groove.

Preferably, the first mounting device of the mounting system further comprises a first securing device, which can be connected to the first and/or the second galley appliance, and a second securing device which is complementary to the first securing device of the first mounting device. The second securing device preferably forms a component of the second mounting device and is preferably configured to be fitted in the compartment of the aircraft galley and cooperate with the first securing device on the mounting of the galley appliances in the compartment of the aircraft galley, in order to secure the galley appliances in their position in the compartment of the aircraft galley. In particular, the first and the second securing device have the task of securing the galley appliances in the compartment of the aircraft galley in such a way as to prevent a movement of the galley appliances along the longitudinal axis of the compartment and hence the galley appliances from falling out of the compartment.

In a preferred embodiment of the interface system according to the invention, the first securing device of the first mounting device comprises a first latching element spring-biased into its latching position and the second securing device of the second mounting device comprises a second latching element which can be fitted in the compartment of the aircraft galley, the first latching element of the first mounting device being configured to engage with the second latching element on the mounting of the galley appliances in the compartment of the aircraft galley, when the galley appliances are situated in a desired position in the compartment of the aircraft galley. Alternatively or additionally to this, the second latching element of the second securing device can also be spring-biased into its latching position and configured to engage with the first latching element on the mounting of the galley appliances in the compartment of the aircraft galley, when the galley appliances are situated in a desired position in the compartment of the aircraft galley. The first and the second securing device can be equipped with an automatic engaging mechanism which brings about an automatic engagement of the first and the second latching element as soon as the galley appliances occupy a desired position in the compartment of the aircraft galley. Alternatively to the equipping with an automatic engaging mechanism, however, the first and the second securing device can also be designed such that the interengagement of the first and the second securing device can be effected manually, for example via a corresponding actuating mechanism.

In an alternative embodiment of the interface system according to the invention, the first securing device of the first mounting device comprises a first latching element spring-biased into its unlatching position. The first and the second latching element can then be brought into engagement with one another by a corresponding actuation of the first latching element, by which the first latching element is moved into its latching position, in order to secure the galley appliances in a desired position in the compartment of the aircraft galley. Alternatively or additionally to this, the second latching element of the second securing device can also be spring-biased into its unlatching position and be brought into engagement with the first latching element by a corresponding actuation, by which the second latching element is moved into its latching position. The first and/or the second latching element can be biased into its/their latching position or unlatching position, for example, by means of a leaf spring, bending spring, torsion spring or spiral spring.

The first latching element can, for example, be rotatably mounted about an axis of rotation and movable by a rotary movement about the axis of rotation between its latching position and its unlatching position. The axis of rotation extends, for example, perpendicularly to the longitudinal axis of the aircraft galley compartment. The second latching element can then be designed in the form of a projection which engages behind the first latching element in its latching position. Alternatively to this, the first latching element can be displaceably mounted along an axis which preferably extends perpendicularly to the longitudinal axis of the aircraft galley compartment and movable by displacement along the axis between the latching position and the unlatching position. The second latching element is then designed, for example, in the form of a receiving device in which the first latching element is received in its latching position. In particular, it is conceivable for the second latching element to be formed by a recess or opening in the second guide rail of the mounting system of the interface system according to the invention, into which a first latching element formed as a latching pin can be pushed to secure the galley appliances in their position in the compartment of the aircraft galley.

The second latching element can be fastened, for example, to an outer border of a bottom plate of the compartment of the aircraft galley. Alternatively to this, the second latching element can also be attached to a side wall of the compartment of the aircraft galley, the second latching element then preferably being attached in a lower region of the side wall of the compartment of the aircraft galley facing the bottom plate of the compartment of the aircraft galley. Moreover, the second latching element can be arranged in a front or, alternatively to this, rear region of the compartment. The arrangement of the first latching element of the first mounting device on the first and/or the second galley appliance is preferably adapted to the position of the second latching element of the second mounting device in the compartment of the aircraft galley. For example, the first latching element can be arranged on a lower border of the first and/or the second galley appliance and/or in the region of a front border of the first and/or second galley appliance facing a user of the galley appliances in the state of the galley appliances when mounted in the compartment of the aircraft galley.

The interface system according to the invention preferably comprises two first latching elements and two second latching elements which can be arranged in the region of two mutually facing side walls of the galley appliances or in the region of two mutually facing side walls of the compartment of the aircraft galley. Further, it is conceivable to equip the interface system according to the invention with one or two first latching element(s) rotatably mounted about an axis of rotation and one or two second latching element(s) of correspondingly complementary form, and additionally with one or two first latching element(s) displaceably mounted along an axis and one or two second latching element(s) of correspondingly complementary form.

Preferably, the first securing device of the first mounting device further comprises an actuating element for moving the first latching element between its latching position and its unlatching position. If the first securing device comprises a first latching element spring-biased into its latching position, the actuating element serves primarily to move the first latching element from its latching position into its unlatching position. By contrast, if the first securing device comprises a first latching element spring-biased into its unlatching position, the actuating element serves primarily to move the first latching element from its unlatching position into its latching position. Additionally or alternatively to this, the second securing device of the second mounting device can comprise an actuating element for moving the second latching element between its latching position and its unlatching position. If the second securing device comprises a second latching element spring-biased into its latching position, the actuating element then serves primarily to move the second latching element from its latching position into its unlatching position. By contrast, if the second securing device comprises a second latching element spring-biased into its unlatching position, the actuating element serves primarily to move the second latching element from its unlatching position into its latching position.

The actuating element of the first securing device can be connected to the first latching element via a connecting element. Similarly, an actuating element of the second securing device can be connected to the second latching element via a connecting element. The connecting element enables the actuating element and the latching element, movable by the actuating element between its latching position and its unlatching position, to be arranged at different positions on the first and/or second galley appliance or in the compartment of the aircraft galley.

The connecting element can comprise, for example, mechanical components, such as for example pushing, pulling or turning connections, coupling linkages, coupling joints, movement deflectors, movement distributors or the like, or electrical components, such as for example actuators, servomotors or the like. The connecting element can, however, also be formed in one piece with the actuating element. The actuating element of the first securing device can, just as the actuating element of the second securing device, be configured to move two or more latching elements between their latching position and their unlatching position, for example by a corresponding design of a connecting element.

In a preferred embodiment of the interface system according to the invention, the actuating element of the first mounting device is pivotable about an axis between an unactuated position and an actuating position. If the first latching element is spring-biased into its latching position, the actuating element is preferably configured to is keep, in its actuated position, the first latching element in its unlatching position. By contrast, if the first latching element is spring-biased into its unlatching position, the actuating element is preferably configured to keep, in its actuated position, the first latching element in its latching position. Similarly, an actuating element of the second mounting device can be pivotable about an axis between an unactuated position and an actuating position. If the second latching element is spring-biased into its latching position, the actuating element of the second mounting device is then preferably configured to keep, in its actuated position, the second latching element in its unlatching position. By contrast, if the second latching element is spring-biased into its unlatching position, the actuating element is preferably configured to keep, in its actuated position, the second latching element in its latching position.

In a preferred embodiment of the interface system according to the invention, the actuating element extends in its actuating position at an angle of 30 to 90°, preferably 60°, to a lateral surface of the first and/or the second galley appliance when the first securing device is connected to the first and/or the second galley appliance, which lateral surface forms a front side of the first and/or the second galley appliance in the state of the first and/or the second galley appliance when arranged in the compartment of the aircraft galley. By contrast, in its unactuated position, the actuating element preferably extends substantially parallel to this lateral surface of the first and/or the second galley appliance. The actuating element then bears against the front side of the galley appliances in its unactuated position and thus offers little or no engagement surface, with the result that space is saved and the risk of an undesired actuation of the actuating element is minimised.

By contrast, in its actuating position, the actuating element can serve as a handle which facilitates the removal of the galley appliances from the compartment of the aircraft galley. For example, an actuating element usable as a handle can be designed in the form of a flap which extends substantially over the width of the galley appliances and/or the width of the compartment of the aircraft galley in the state of the galley appliances when mounted in the compartment of the aircraft galley. An actuating element of the second mounting device can be designed just as described here in connection with an actuating element of the first mounting device.

An appliance module for an aircraft galley according to the invention comprises at least a first and at least a second galley appliance which are connected to the first connection element of an interface system described above, an internal electrical system, an internal freshwater supply system and/or an internal wastewater disposal system of the galley appliances being connected to the appliance connection devices of the first connection element of the interface system according to the invention.

Preferably, the first and the second galley appliance of the appliance module according to the invention are arranged beside, above and/or behind one another in relation to a longitudinal axis of the galley appliance. The appliance module can also comprise a first, a second and a third galley appliance, it being possible, for example, for the first and the second galley appliance to be provided to be arranged beside one another in a front region of the compartment of the aircraft galley facing a user. By contrast, the third galley appliance can be provided for arrangement in a rear region of the compartment. Such a configuration of the appliance module is suitable, for example, when the third galley appliance is designed in the form of a water storage tank or water heater which supplies the first and/or the second galley appliance with water, but does not have to be directly accessible to a user during the operation of the aircraft galley.

In a method for mounting a first and a second galley appliance in an aircraft galley according to the invention, first of all an internal electrical system, an internal freshwater supply system and/or an internal wastewater disposal system of the first galley appliance is connected to the first appliance connection device of the first connection element of an interface system described above. Further, an internal electrical system, an internal freshwater supply system and/or an internal wastewater disposal system of the second galley appliance is connected to the second appliance connection device of the first connection element of an interface system described above. These mounting steps can be carried out outside the aircraft galley. Further, the second connection element of the interface system is fixed in a compartment of the aircraft galley.

Subsequently, the galley appliances, connected to the first connection element of the interface system, are introduced into the compartment of the aircraft galley. Finally, the aircraft galley connection device of the first connection element is connected to the aircraft galley connection device of the second connection element. As a result, with the aid of the distributor system of the first connection element, the first and the second appliance connection device of the first connection element and thus the internal electrical system, the internal freshwater supply system and/or the internal wastewater disposal system of the first and/or the second galley appliance are connected to the electrical system, the freshwater supply system and/or the wastewater disposal system of the aircraft galley. The method according to the invention allows an appliance module comprising a plurality of galley appliances to be largely preassembled and, on the final assembly, to be installed in the aircraft galley with only a small amount of work. The time and personnel required on the final assembly of the galley appliances can thereby be reduced.

In a preferred embodiment of the method, the first and the second galley appliance are connected to one another and thus secured in their position relative to one another by means of a connecting device of the interface system described above before the galley appliances are introduced into the compartment of the aircraft galley.

BRIEF DESCRIPTION OF THE DRAWINGS

Preferred embodiments of the invention will now be explained in more detail with the aid of the appended schematic drawings, of which FIG. 9 shows a holding strut of the interface system according to FIG. 5, FIG. 10 shows a holding device of the interface system according to FIG. 5.

DETAILED DESCRIPTION

Figure 1:
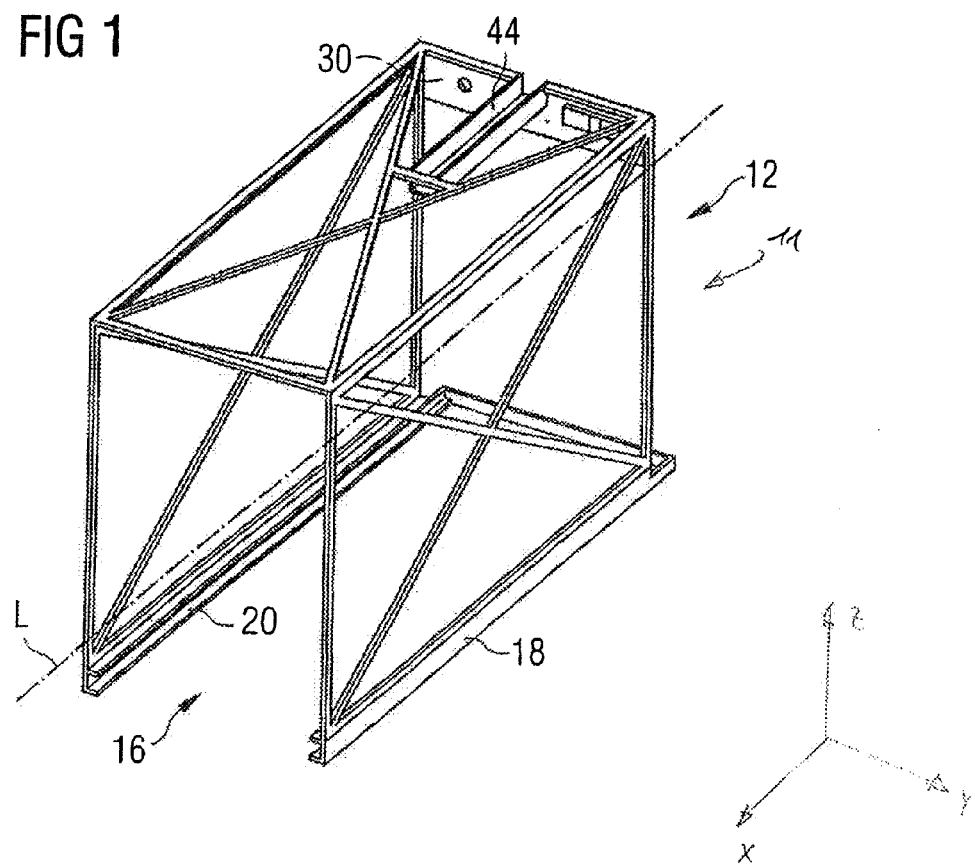
FIG. 1 shows a part of a first embodiment of an interface system for use in an aircraft galley.
Figure 2:
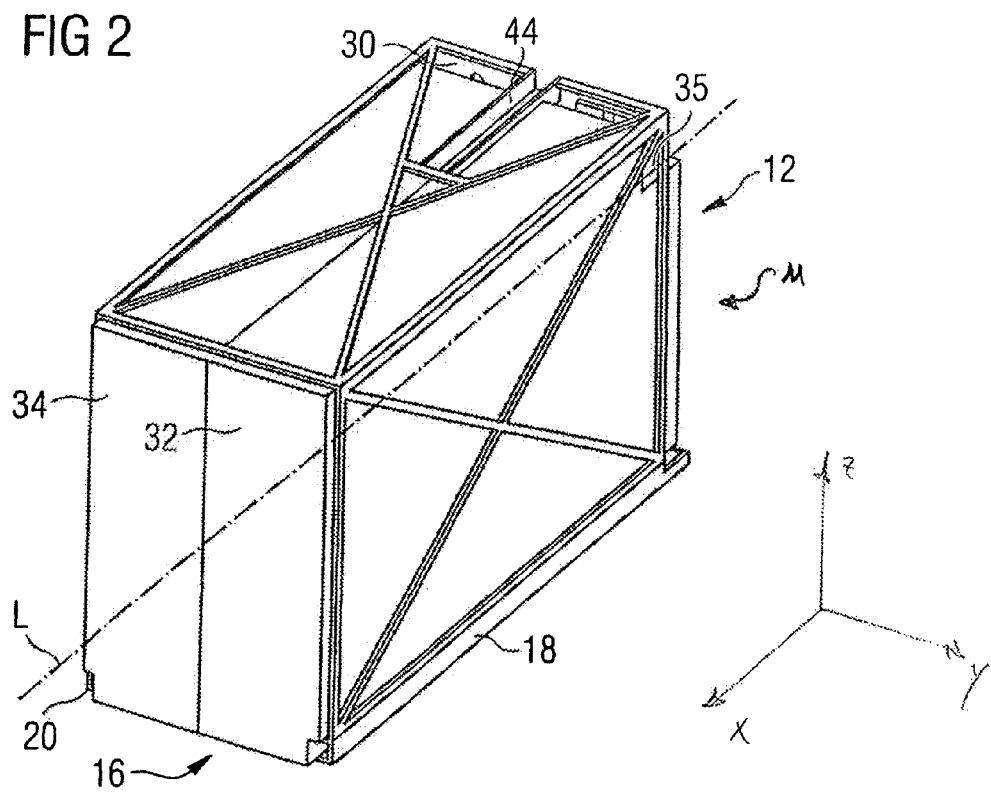
FIG. 2 shows the part of the interface system according to FIG. 1 in a state when connected to two galley appliances to form an appliance module.

In the figures, an interface system provided for use in an aircraft galley is denoted generally by 10. The interface system 10 comprises a connecting device 11 which serves to secure a plurality of galley appliances 32, 34, provided for mounting in the aircraft galley, in their position relative to one another. In the embodiment of the interface system 10 illustrated in FIGS. 1 to 4, the connecting device 11 comprises a carrier structure 12, the carrier structure 12 having a cuboid-shaped basic shape adapted to the shape of a compartment 14 of an aircraft galley. The carrier structure 12 is formed by a plurality of struts. In particular, the carrier structure 12 comprises, besides horizontal and vertical struts defining lateral surfaces of the cuboid-shaped carrier structure basic shape, diagonal struts serving to stiffen the carrier structure is 12.

Further, the interface system 10 comprises a mounting system 15 which serves to secure the galley appliances 32, 34 in their position relative to the compartment 14. A first mounting device 16 of the mounting system 15 is fastened to the carrier structure 12 of the interface system 10. The first mounting device 16 comprises two first guide rails 18, 20 which are fastened to two mutually opposite horizontal struts of the carrier structure 12 and extend, in a state of the carrier structure 12 when mounted in the compartment 14 of the aircraft galley, adjacently to a bottom plate 22 of the compartment 14 of the aircraft galley in the direction of a longitudinal axis L of the carrier structure 12, the galley appliances 32, 34 and the compartment 14.

The first guide rails 18, 20 of the first mounting device 16 are provided to cooperate with two second guide rails 24 of a second mounting device 28 of the mounting system 15, only one second guide rail 24 being visible in FIGS. 1 to 4. The second guide rails 24 of the second mounting device 28 are fastened to the bottom plate 22 of the compartment 14 of the aircraft galley and extend, just as the first guide rails 18, 20 of the first mounting device 16, in the direction of the longitudinal axis L. Through the cooperation of the first guide rails 18, 20 of the first mounting device 16 with the second guide rails 24 of the second mounting device 28, the carrier structure 12 can be mounted in the compartment 14 of the aircraft galley in a simple manner by pushing into the compartment 14 of the aircraft galley.

In the state of the carrier structure 12 when mounted in the compartment 14 of the aircraft galley, the carrier structure 12 is secured in its position in the compartment 14 of the aircraft galley already to a certain degree through the cooperation of the first guide rails 18, 20 of the first mounting device 16 with the second guide rails 24 of the second mounting device 28. In order also to prevent undesired displacement of the carrier structure 12 in the compartment 14 of the aircraft galley in the direction of the longitudinal axis L of the compartment 14 of the aircraft galley, the interface system 10 further comprises a securing system. Possible configurations of this securing system are explained in more detail below in connection with FIGS. 9 and 12.

The interface system 10 further comprises a first connection element 30. The first connection element 30 is configured to be connected to an internal electrical system, an internal freshwater supply system and/or an internal wastewater disposal system of a first galley appliance 32, and to an internal electrical system, an internal freshwater supply system and/or an internal wastewater disposal system of a second galley appliance 34. In FIGS. 1 to 4, the first connection element 30 is merely schematically illustrated. The construction of the first connection element 30 is therefore discussed below in connection with FIGS. 5 and 6.

In order to facilitate the connection of the internal electrical system, internal freshwater supply system and/or internal wastewater disposal system of the galley appliances 32, 34 to the first connection element 30, the housings of the galley appliances 32, 34 are provided with a recess 35 in the region of a lateral surface facing the first connection element 30. Electrical lines, conduits serving to supply fresh water and/or to dispose of wastewater of the galley appliances 32, 34 can be securely received in the recess 35, without hindering the mounting of the galley appliances 32, 34 in the carrier structure 12 or the compartment 14 of the aircraft galley.

Figure 3:
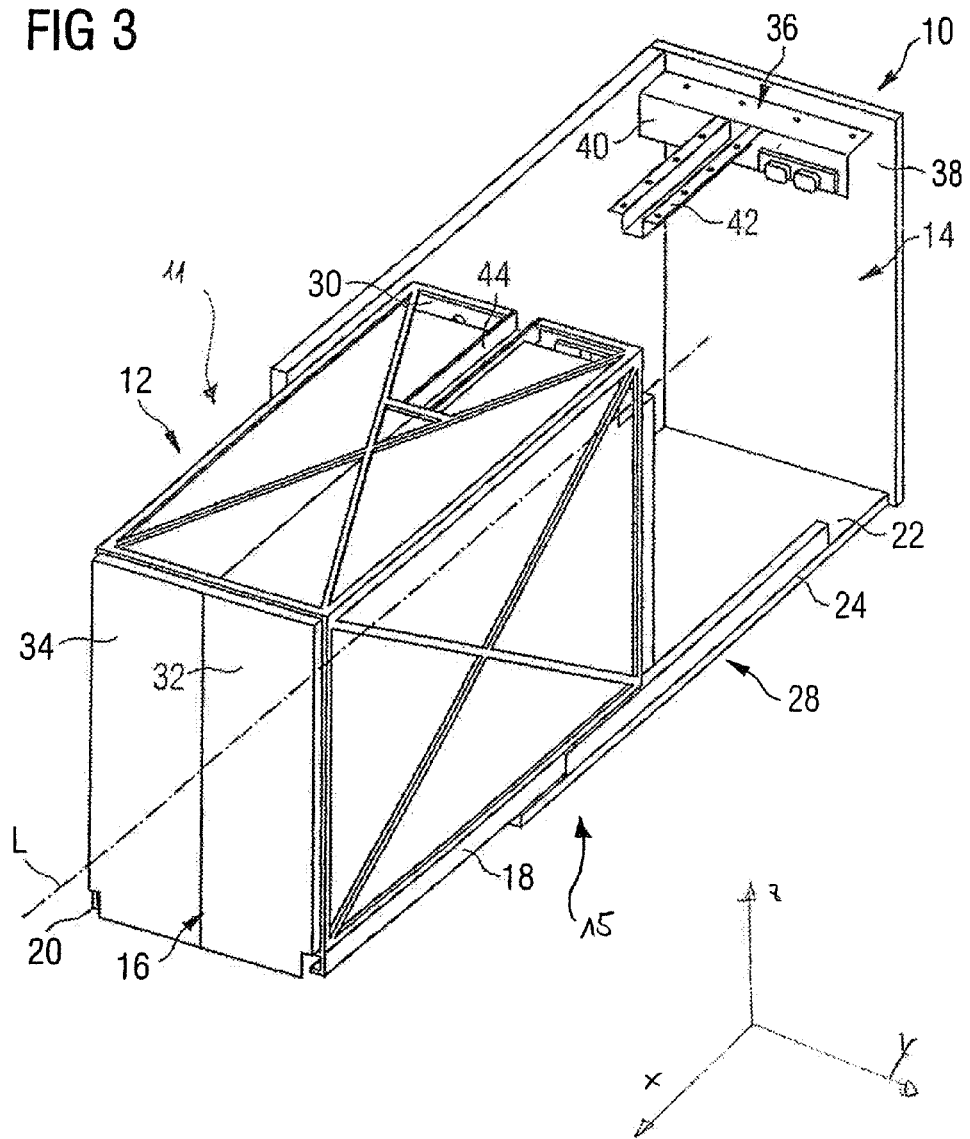
FIG. 3 shows the appliance module according to FIG. 2 on the mounting in a compartment of an aircraft galley.
Figure 4:
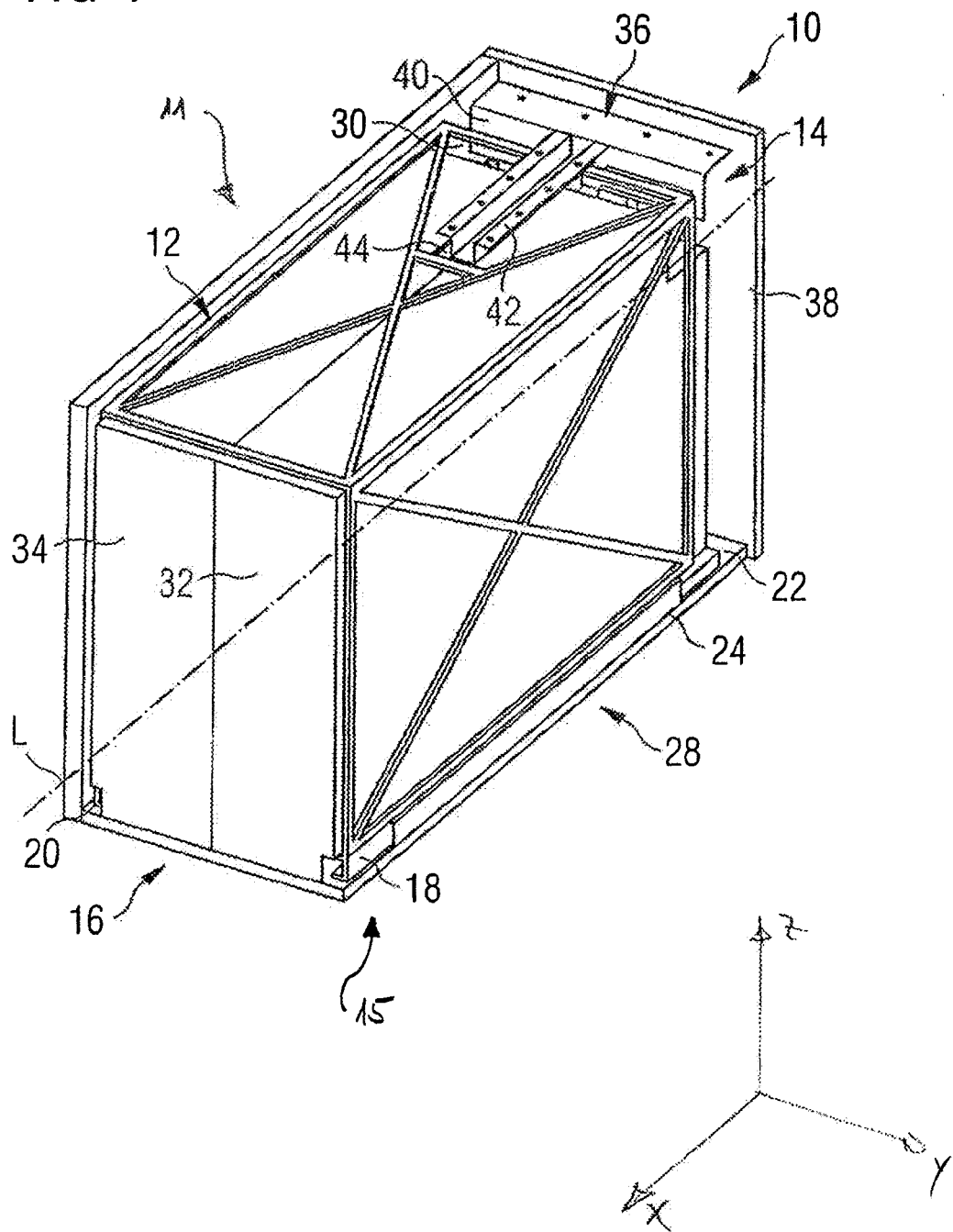
FIG. 4 shows the appliance module according to FIG. 2 in a state when mounted in the compartment of the aircraft galley.

As can be seen in FIGS. 3 and 4, the interface system 10 further comprises a second connection element 36 complementary to the first connection element 30. The second connection element 36 is fastened to a rear wall 38 of the compartment 14 of the aircraft galley in a position which is adapted to the arrangement of the first connection element 30. When the galley appliances 32, 34 are mounted in the compartment 14 of the aircraft galley, the first connection element 30 cooperates with the second connection element 36. The second connection element 36 is connected to an electrical system, freshwater supply system and/or wastewater disposal system of the aircraft galley, not illustrated specifically in the figures. Through the cooperation of the first connection element 30 with the second connection element 36, a plug-and-play connection is created by which the galley appliances 32, 34 connected to the interface system 10 are automatically connected to the electrical system, the freshwater supply system and/or the wastewater disposal system of the aircraft galley on the mounting in the compartment 14 of the aircraft galley.

The second connection element 36 is fixed by means of a fixing device 40 to the rear wall 38 of the compartment 14 of the aircraft galley. A guide projection 42, designed in the form of a U-shaped profile, extends from the fixing device 40, designed in the form of an L profile. The guide projection 42 is provided to be received in a guide opening 44. The guide opening 44 is designed as a U-profile-shaped guide groove and extends from the first connection element 30 along the longitudinal axis L of the is carrier structure 12 in the direction of an interior space of the carrier structure 12. Through the cooperation of the guide projection 42 with the guide opening 44, the carrier structure 12 is conveniently positioned in the compartment 14 of the aircraft galley in such a way that the first connection element 30 can securely engage with the second connection element 36.

FIGS. 5 to 10 show a further embodiment of an interface system 10 provided for use in an aircraft galley, it being possible for features which are explained here in connection with the interface system 10 illustrated in FIGS. 5 to 10 also to be embodied in the interface system 10 according to FIGS. 1 to 4. In the interface system 10 according to FIGS. 5 to 10, however, configuring the connecting device 11 with a carrier structure 12 is dispensed with, for additional space and weight saving.

Figure 5:
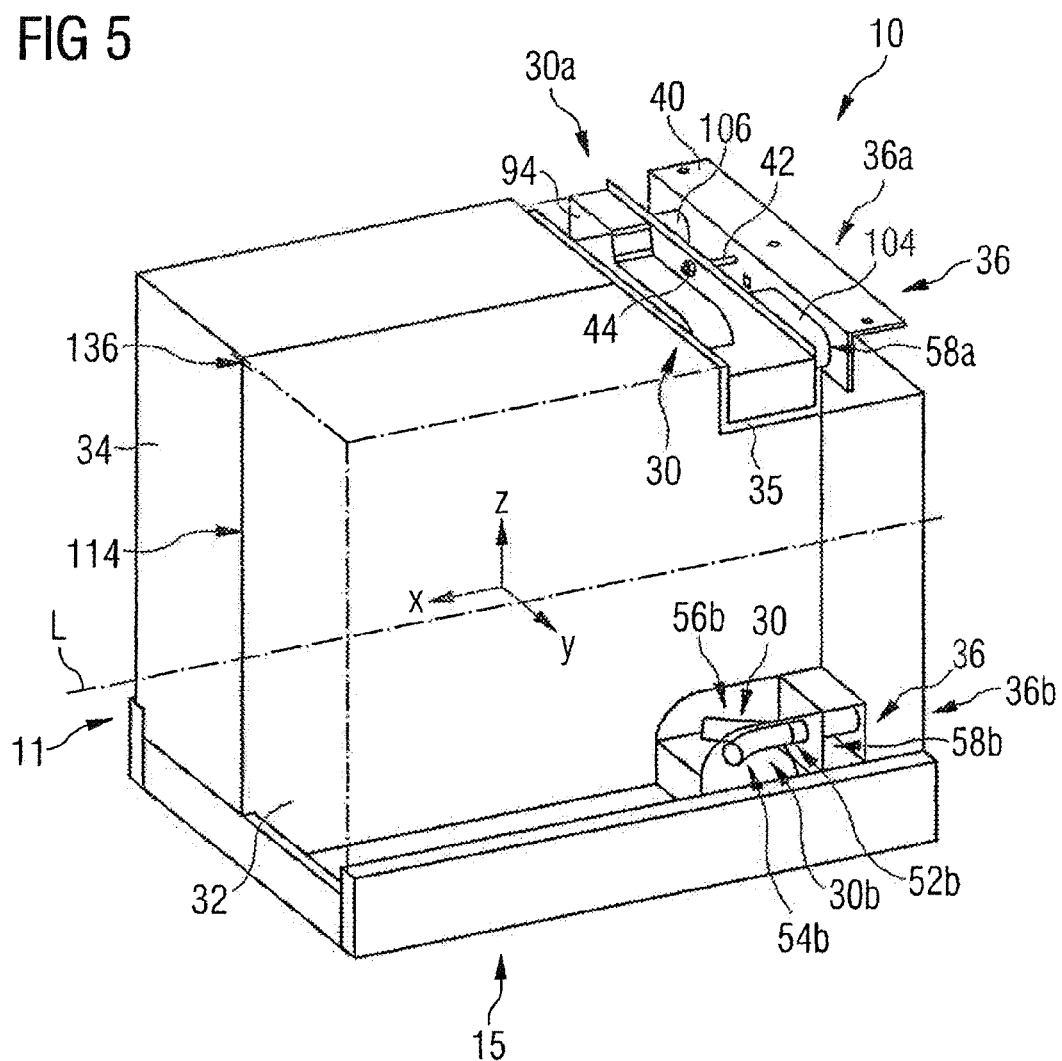
FIG. 5 shows a further embodiment of an interface system for use in an aircraft galley, a part of the interface system being connected to two galley appliances to form an appliance module.
Figure 6:
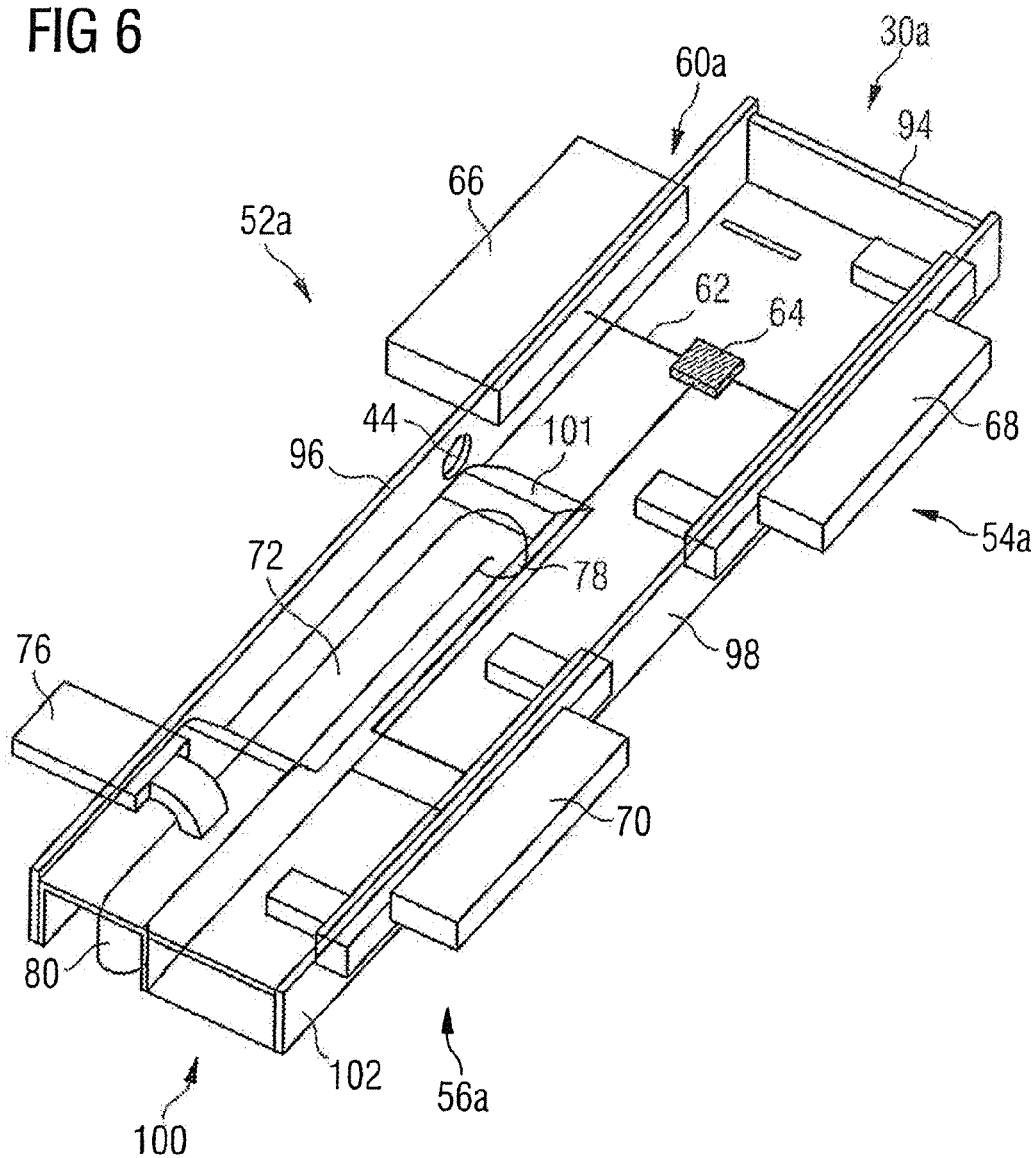
FIG. 6 shows a detail view of a first section of a first connection element of the interface system according to FIG. 5.
Figure 7:
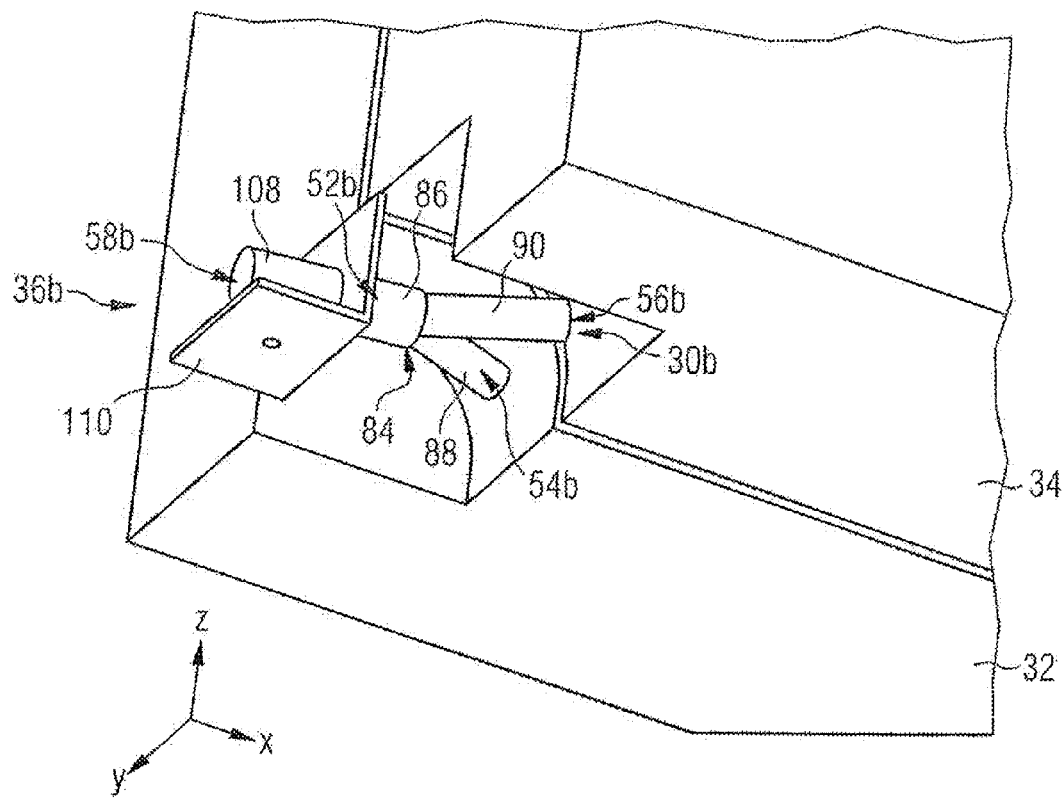
FIG. 7 shows a detail view of a second section of the first connection element of the interface system according to FIG. 5.

As will be evident from FIGS. 5 to 8, the first connection element 30 comprises a first section 30a, illustrated in detail in FIG. 6, and a second section 30b, shown in a detail view in FIG. 7. The first connection element 30 comprises an aircraft galley connection device 52a, 52b, a first appliance connection device 54a, 54b and a second appliance connection device 56a, 56b. Owing to the two-part configuration of the first connection element 30, the aircraft galley connection device 52a, 52b, the first appliance connection device 54a, 54b and the second appliance connection device 56a, 56b are each likewise of two-part design, first sections 52a, 54a, 56a of the aircraft galley connection device 52a, 52b, of the first appliance connection device 54a, 54b and of the second appliance connection device 56a, 56b are each assigned to the first section 30a of the first connection element 30 and second sections 52b, 54b, 56b of the aircraft galley connection device 52a, 52b, of the first appliance connection device 54a, 54b and of the second appliance connection device 56a, 56b are each assigned to the second section 30b of the first connection element 30. The first connection element 30 can be connected via the first appliance connection device 54a, 54b to an internal electrical system, an internal freshwater supply system and an internal wastewater disposal system of the first galley appliance 32. Further, the first connection element 30 can be connected via the second appliance connection device 56a, 56b to an internal electrical system, an internal freshwater supply system and an internal wastewater disposal system of the second galley appliance 34.

The first connection element 30 further comprises a distributor system 60a, 60b, likewise of two-part design. A first section 60a of the distributor system 60a, 60b connects the first section 52a of the aircraft galley connection device 52a, 52b, assigned to the first section 30a of the first connection element 30, to the first sections 54a, 56a of the first and the second appliance connection device 54a, 54b, 56a, 56b, see FIG. 6. A second section 60b of the distributor system 60a, 60b connects the second section 52b of the aircraft galley connection device 52a, 52b, assigned to the second section 30b of the first connection element 30, to the second sections 54b, 56b of the first and the second appliance connection device 54a, 54b, 56a, 56b, see FIG. 7.

The first section 60a of the distributor system 60a, 60b comprises a current distributor 62 which, with the aid of an electronic circuit 64, connects an electrical connection 66 of the first section 52a of the aircraft galley connection device 52a, 52b to an electrical connection 68 of the first section 54a of the first appliance connection device 54a, 54b and to an electrical connection 70 of the first section 56a of the second appliance connection device 56a, 56b, see FIG. 6. The electronic circuit 64 ensures that the total electrical power drawn from the electrical system of the aircraft galley by the galley appliances 32, 34 does not exceed a preset value. The electrical connections 66, 68, 70 can be designed as standard plugs.

The first section 60a of the distributor system 60a, 60b further comprises a freshwater distributor 72 which, via a freshwater pipe system, connects a freshwater connection 76 of the first section 52a of the aircraft galley connection device 52a, 52b to a freshwater connection 78 of the first section 54a of the first appliance connection device 54a, 54b and to a freshwater connection 80 of the first section 56a of the second appliance connection device 56a, 56b, see FIG. 6. The freshwater connections 76, 78, 80 prevent an undesired outflow of freshwater when the first section 30a of the first connection element 30 is not connected on the aircraft galley side or on the galley appliance side. The freshwater pipe system comprises three 90° pipe bends, and a distributor pipe.

The second section 60b of the distributor system 60a, 60b comprises a wastewater distributor 82 which, via a wastewater pipe system, connects a wastewater connection 86 of the second section 52b of the aircraft galley connection device 52a, 52b to a wastewater connection 88 of the second section 54b of the first appliance connection device 54a, 54b and to a wastewater connection 90 of the second section 56b of the second appliance connection device 56a, 56b, see FIG. 7. The is wastewater connections 86, 88, 90 prevent the undesired outflow of wastewater when the second section 30b of the first connection element 30 is not connected on the aircraft galley side or the galley appliance side. The wastewater pipe system is designed substantially in the form of a Y-shaped distributor pipe.

When the galley appliances 32, 34 are mounted in the compartment 14 of the aircraft galley, the freshwater connections 76, 78, 80 are situated in an upper (in the direction of z) and at the same time rear (in the opposite direction to x) region of the compartment 14, while the wastewater connections 86, 88, 90 are situated in a lower (in the opposite direction to z) and at the same time rear (in the opposite direction to x) region of the compartment 14. Through such an arrangement of the fresh water connections 76, 78, 80 and wastewater connections 86, 88, 90, fresh water can flow from above into the galley appliances 32, 34 and wastewater can flow downwards out of the galley appliances 32, 34 utilising the gravitational force oriented in the opposite direction to z.

The current distributor 62 and the freshwater distributor 72 are received in a housing 94 of the first section 30a of the first connection element 30. As a result, the electronic circuit 64 of the electrical current distributor 62 and the freshwater pipe system of the freshwater distributor 72 are securely stowed and protected in a sturdy enclosure. The electrical connection 66 and the freshwater connection 76 of the first section 52a of the aircraft galley connection device 52a, 52b are arranged separated from one another on a first lateral surface 96 of the housing 94 facing the rear wall 38 of the compartment 14 of the aircraft galley in the state of the galley appliances 32, 34 when mounted in the compartment 14, and extend in the direction of the rear wall 38 of the compartment 14 (in the opposite direction to x). The electrical connections 68, 70 of the first sections 54a, 56a of the appliance connection devices 54a, 54b, 56a, 56b are arranged separated from one another on a second lateral surface 98 of the housing 94 opposite the first lateral surface 96. The freshwater connections 78, 80 of the first sections 54a, 56a of the appliance connection devices 54a, 54b, 56a, 56b, by contrast, are arranged in the region of a third lateral surface 100 of the housing 94 adjoining the first and the second lateral surface 96, 98 of the housing 94 and facing the bottom plate 22 of the compartment 14 of the aircraft galley in the state of the galley appliances 32, 34 when mounted in the compartment 14. The freshwater distributor 72 and the current distributor 62 are separated from one another in the housing 94 by a partition wall 101, so that in the event of a leak in the freshwater pipe system of the freshwater distributor 72 no water can come is into contact with the electronic circuit 64 of the current distributor 62.

Unlike the first section 30a of the first connection element 30, the second section 30b of the first connection element 30 does not comprise a housing. Similar to the freshwater connection 76 of the first section 52a of the aircraft galley connection device 52a, 52b, however, the wastewater connection 86 of the second section 52b of the aircraft galley connection device 52a, 52b also extends in the direction of the rear wall 38 of the compartment 14 of the aircraft galley in the state of the galley appliances 32, 34 when mounted in the compartment 14 (in the direction opposite to x).

Figure 8:
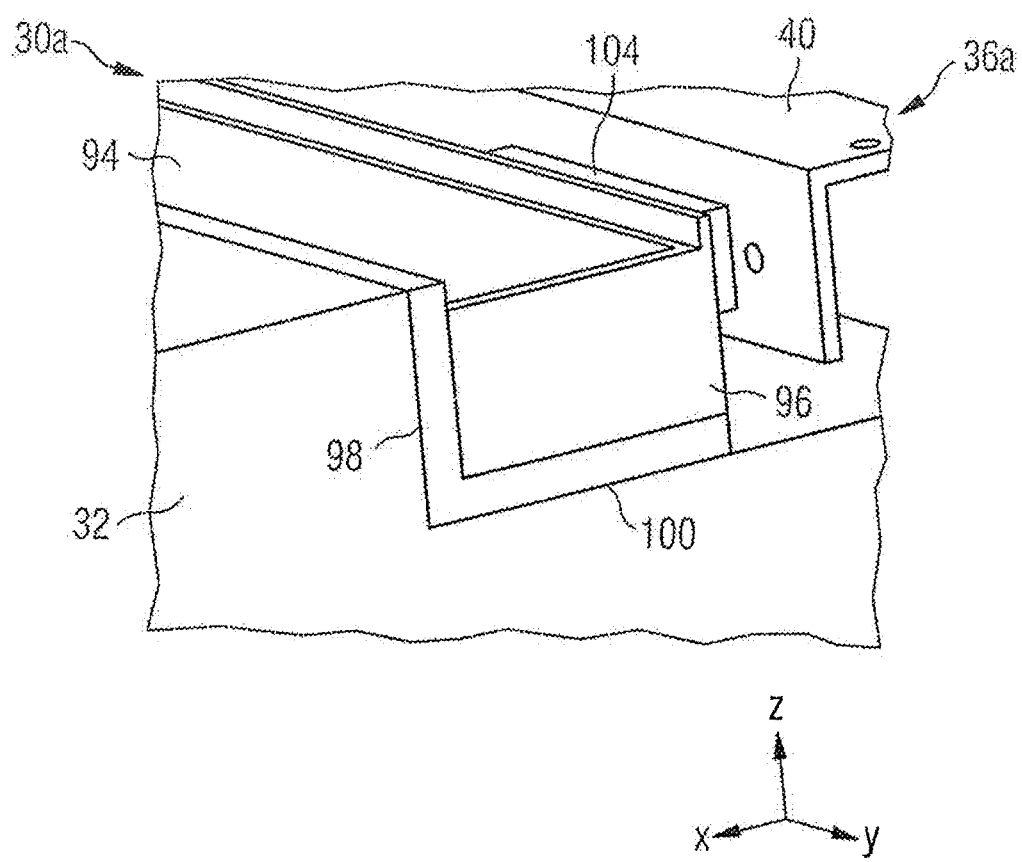
FIG. 8 shows a detail view of the first section of the first connection element according to FIG. 6.

The second connection element 36 of the interface system 10, shown in FIGS. 5 and 8 is, just as the first connection element 30, of two-part design and comprises a first section 36a and a second section 36b. The first section 36a of the second connection element 36 is provided to cooperate with the first section 30a of the first connection element 30a, 30b and comprises a first section 58a of an aircraft galley connection device 58a, 58b which is designed to be complementary to the first section 52a of the aircraft galley connection device 52a, 52b formed on the first section 30a of the first connection element 30. The first section 58a of the aircraft galley connection device 58a, 58b comprises an electrical connection 104 which is provided to cooperate with the electrical connection 66 formed on the first section 30a of the first connection element 30a, 30b. Further, the first section 58a of the aircraft galley connection device 58a, 58b comprises a freshwater connection 106 which is provided to cooperate with the freshwater connection 76 formed on the first section 30a of the first connection element 30a, 30b. The first section 36a of the second connection element 36 can be fixed in the compartment 14 of the aircraft galley by means of the fixing device 40 designed in the form of an L-profile.

The second section 36b of the second connection element 36 is provided to cooperate with the second section 30b of the first connection element 30a, 30b and comprises a second section 58b of the aircraft galley connection device 58a, 58b which is designed to be complementary to the second section 52b of the aircraft galley connection device 52a, 52b formed on the second section 30b of the first connection element 30, see FIG. 7. The second section 58b of the aircraft galley connection device 58a, 58b comprises a wastewater connection 108 which can be fixed to the bottom plate 22 or the rear wall 38 of the compartment 14 of the aircraft galley by means of a holding profile 110 designed in the form of an L-profile.

As can be seen in FIG. 8, the walls of the housing 94 of the first section 30a of the first connection element 30a, 30b are strengthened in the region of the second and the third lateral surface 98, 100 of the housing 94 and thus form part of the connecting device 11 which secures the first and the second galley appliances 32, 34 in their position relative to one another. Further, the connecting device 11 comprises a holding strut 112, shown in FIGS. 5 and 9. The holding strut 112 is fixed to the first and the second galley appliance 32, 34 and is situated, in the state of the first and the second galley appliance 32, 34 when mounted in the compartment 14 of the aircraft galley, in the region of a front side 114 of the first and the second galley appliance 32, 34 accessible to a user. The holding strut 112 extends substantially parallel to the direction y, i.e. parallel to the bottom plate 22 of the compartment 14 of the aircraft galley in the state of the first and the second galley appliance 32, 34 when mounted in the compartment 14. Moreover, the holding strut 112 extends substantially over the entire width of the first and the second galley appliance 32, 34 and adjoins the lateral surfaces of the compartment 14.

As will be clear from FIG. 9, the holding strut 112 is designed substantially as a hollow body of rectangular cross-section. In the region of a side wall 116 which bears against the front side of the galley appliances 32, 34 in the state of the holding strut 112 when connected to the galley appliances 32, 34, the holding strut 112 is of strengthened design. A structural assembly, composed of the galley appliances 32, 34 and the holding strut 112 by screwing or adhesively bonding the strengthened side wall 116 of the holding strut 112 to the first and second galley appliances 32, 34, is strengthened and/or stiffened particularly effectively by this design of the holding strut 112.

The connecting device 11 of the interface system 10 further comprises a holding device 136. As illustrated in more detail in FIG. 10, the holding device 136 comprises a connecting pin 138 and a spacer 140. The connecting pin 138 is connected at its first end to the first galley appliance 32 and at its second end to the second galley appliance 34. The connecting pin 138 is received, for example, in a recess provided on the galley appliances 32, 34 and is screwed or adhesively bonded to the galley appliances 32, 34. The holding device 136 connects the first galley appliance 32 to the second galley appliance 34 and keeps the first galley appliance 32 at a desired distance from the second galley appliance 34 with the aid of the spacer 140.

As illustrated in FIG. 5, a cylindrical guide projection 42 extends from the first fixing device 40 along the direction x. The guide projection 42 is provided to be received in a guide opening 44 formed in the first lateral surface 96 of the housing 94 of the first section 30a of the first connection element 30a, 30b. The guide projection 42 and the guide opening 44 form part of the mounting system 15 which secures the first and the second galley appliance 32, 34 in their position relative to the compartment 14.

Figure 11A:
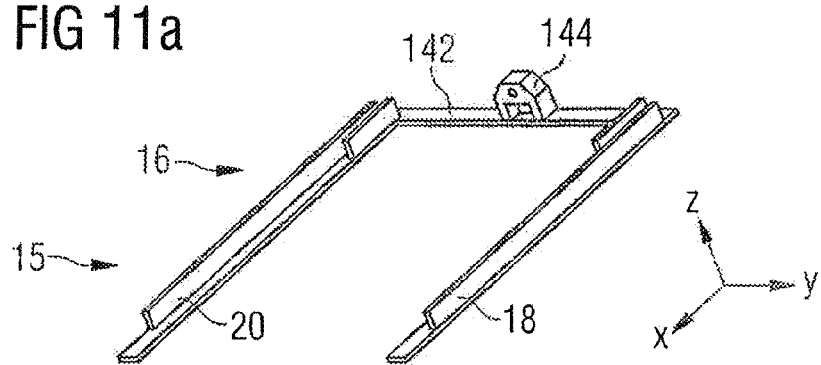
FIG. 11a shows first guide rails of a first mounting device of the interface system according to FIG. 5.
Figure 11B:
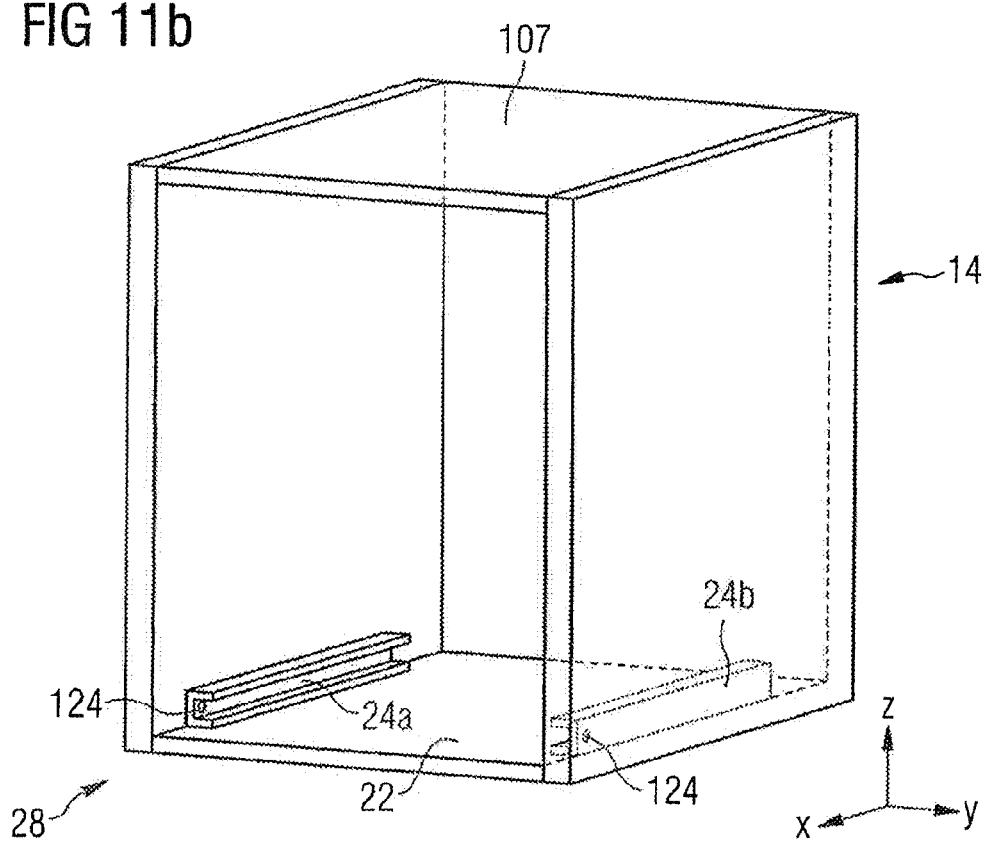
FIG. 11b shows second guide rails, mounted in a compartment of an aircraft galley, of a second mounting device of the interface system according to FIG. 5.

Further, the mounting system 15, shown in FIG. 11a, comprises a first mounting device 16 with two first guide rails 18, 20 which are connected to one another by a connecting section 142. The U-shaped structure of the first mounting device 16 has the advantage that, by fixing the guide rail 18 to the first galley appliance 32 and by fixing the guide rail 20 to the second galley appliance 34, the galley appliances 32, 34 are additionally secured in their position relative to one another with the aid of the connecting section 142. The connecting section 142 further has a holding structure 144 which extends away from the connecting section 142 and is configured to receive the wastewater distributor 82 of the second section 30b of the first connection element 30. The first guide rails 18, 20 of the first mounting device 16 are provided to cooperate with two second guide rails 24a, 24b of the second mounting device 28 of the mounting system 15, see FIG. 11b. The second guide rails 24a, 24b of the second mounting device 28 are fixed to the bottom plate 22 of the compartment 14 of the aircraft galley and extend in the direction x, just as the first guide rails 18, 20 of the first mounting device 16.

Further, the mounting system 15 comprises a securing system with a first securing device 26 assigned to the first mounting device 16 and a second securing device 27 assigned to the second mounting device 28. In a first embodiment of the securing system, the first securing device 26 is received in the holding strut 112 illustrated in detail in FIG. 9 and comprises a first latching element 118 spring-biased into its latching position. The first latching element 118 comprises two cylindrical securing pins which are displaceably received in an enclosure 122. The enclosure 122 is arranged in an edge region of the holding strut 112. The first latching element 118 can be moved between a latching position and an unlatching position by displacement of the securing pins in the direction y. When the first latching element 118 is in its unlatching position, as shown in FIG. 9, the securing pins are received is in the enclosure 122. When the first latching element 118, by contrast, is in its latching position, the securing pins project out of the enclosure 122 and can cooperate with a second latching element 124 of a second securing device 27 assigned to the second mounting device 28. The second latching element 124 of the second securing device 27 comprises two bores formed in the second guide rails 24a, 24b, see FIGS. 9 and 11b. When the first latching element 118 is in its latching position, the securing pins are received in the bores of the second latching element 124, thereby reliably preventing undesired displacement of the galley appliances 32, 34 in the compartment 14 of the aircraft galley.

The first securing device 26 of the first mounting device 16 further comprises an actuating element 126 for moving the first latching element 118 between its latching position and its unlatching position. The actuating element 126 is connected to the first latching element 118 via a connecting element, not shown specifically in FIG. 9, and is pivotable about an axis 128 between an unactuated position and an actuating position, the actuating element 126 in its actuating position keeping the first latching element 118 in its unlatching position against the force applied to the first latching element 118 by the spring and in its unactuated position keeping and/or leaving the first latching element 118 in its latching position. The axis 128 is oriented in the direction y and received in an edge of the holding strut 112. The actuating element 126 extends in the direction y substantially over the length of the holding strut 112 and hence substantially the entire width of the front side 114 of the first and the second galley appliance 32, 34.

In its unactuated position, the actuating element 126 bears against a lateral surface 132 of the holding strut 112 and thus extends substantially parallel to the lateral surface 132 of the strut 112 and hence the front side 114 of the galley appliances 32, 34. In its actuating position shown in FIG. 9, by contrast, the actuating element 126 is tilted upwards in the direction z and extends at an angle of about 60° to the lateral surface 132 of the holding strut 112 and consequently the front side 114 of the galley appliances 32, 34. In its actuating position, it can be used as a handle, for example to pull the galley appliances 32, 34 out of the compartment 14 of the aircraft galley.

Figure 12:
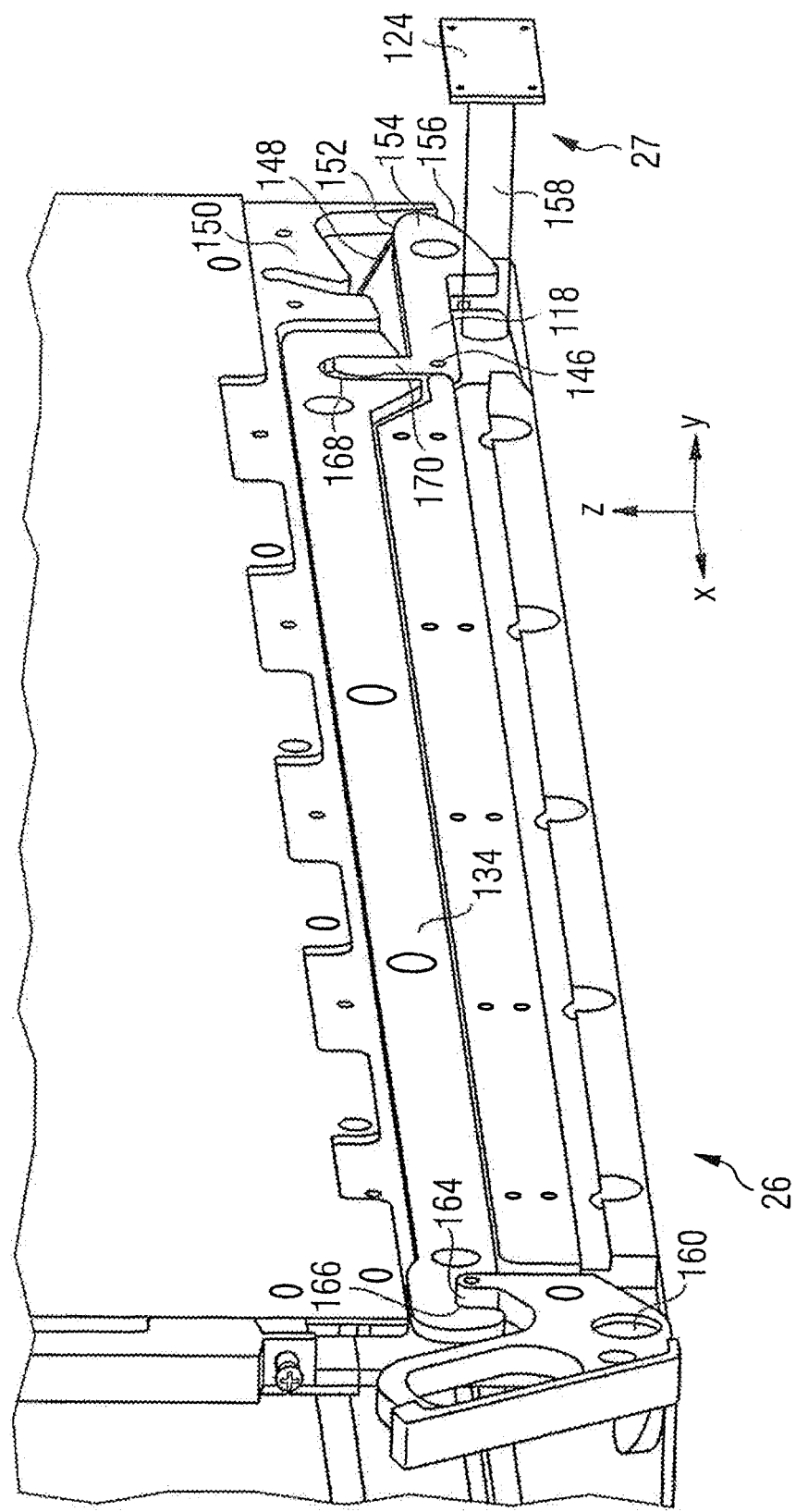
FIG. 12 shows a further embodiment of a first and a second securing device.

FIG. 12 shows a further embodiment of a securing system with a first and a second securing device 26, 27. In particular, FIG. 12 shows components of the first and the second securing device 26, 27 arranged in the region of a side wall of the is galley appliance 32. Further components of the first and the second securing device 26, 27, which are configured identically to the components illustrated in FIG. 12, are provided in the region of a side wall of the galley appliance 34 opposite the side wall of the galley appliance 32.

The first securing device 26 comprises a first latching element 118, rotatably mounted with the aid of a first rotary bearing 146. A spring element 148 is supported on an immovable part 150 and exerts a compressive force on a rotationally movable part 152 of the first latching element 118, whereby the first latching element 118 is biased into its latching position. The first latching element 118 further comprises a hook profile 154 and a guide slope 156. The second securing device 27 can be fitted in a lower region of a side wall of the compartment 14 of the aircraft galleys and comprises a second latching element 124 with a latching projection 158 which is adapted to the hook profile 154 of the first latching element 118 and extends into the compartment 14 of the aircraft galley in the state of the second securing device 27 of the first latching element 118 when mounted in the compartment 14 of the aircraft galley.

On pushing the galley appliances 32, 34 into the compartment 14 of the aircraft galley, the latching projection 158 of the second latching element 124 presses on the guide slope 156 of the first latching element 118 and thus moves the first latching element 118 against the force of the spring 148 into its unlatching position. When the galley appliances 32, 34 have reached their intended position in the compartment 14 of the aircraft galleys, the latching projection 158 is situated in a position which enables the first latching element 118 to move into its latching position owing to its spring-biasing and the hook profile 154 of the first latching element 118 to engage behind the latching projection 158. The first latching element 118 and the second latching element 124 thus automatically engage with one another on the mounting of the galley appliances 32, 34 in the compartment 14 of the aircraft galley.

An actuating element 126 of the first securing device 26 is arranged in the region of the front side 114 of the galley appliances 32, 34 and is rotatably mounted with the aid of a second rotary bearing 160. The actuating element 126 is connected to the first latching element 118 via a rigid connecting element 134 extending along the lower border of the lateral surface of the galley appliance 32 and displaceably mounted inside a linkage passageway. An actuation of the actuating element 126 takes place by manually tilting out the actuating element 126. In the process, the actuating element 126 describes a rotary movement in the x-z plane about the second rotary bearing 160. An actuating nose 164, formed on the actuating element 126 and engaging in a first linkage groove 166 of the connecting element 134, causes a displacement of the connecting element 134 along the direction x in the process. A second linkage groove 168 of the connecting element 134, which groove engages around a lever arm 170 of the first latching element 118, causes on a displacement of the connecting element 134 a rotary movement of the first latching element 118 in the x-z plane about the first rotary bearing 146. As a result, the first latching element 118 is moved against the spring tension of the spring element 148 into its unlatching position.

The interface system 10 can comprise merely a securing system shown in FIG. 9 or merely a securing system shown in FIG. 12. It is also possible, however, to equip the interface system 10 both with a securing system shown in FIG. 9 and with a securing system shown in FIG. 12.

Figure 13:
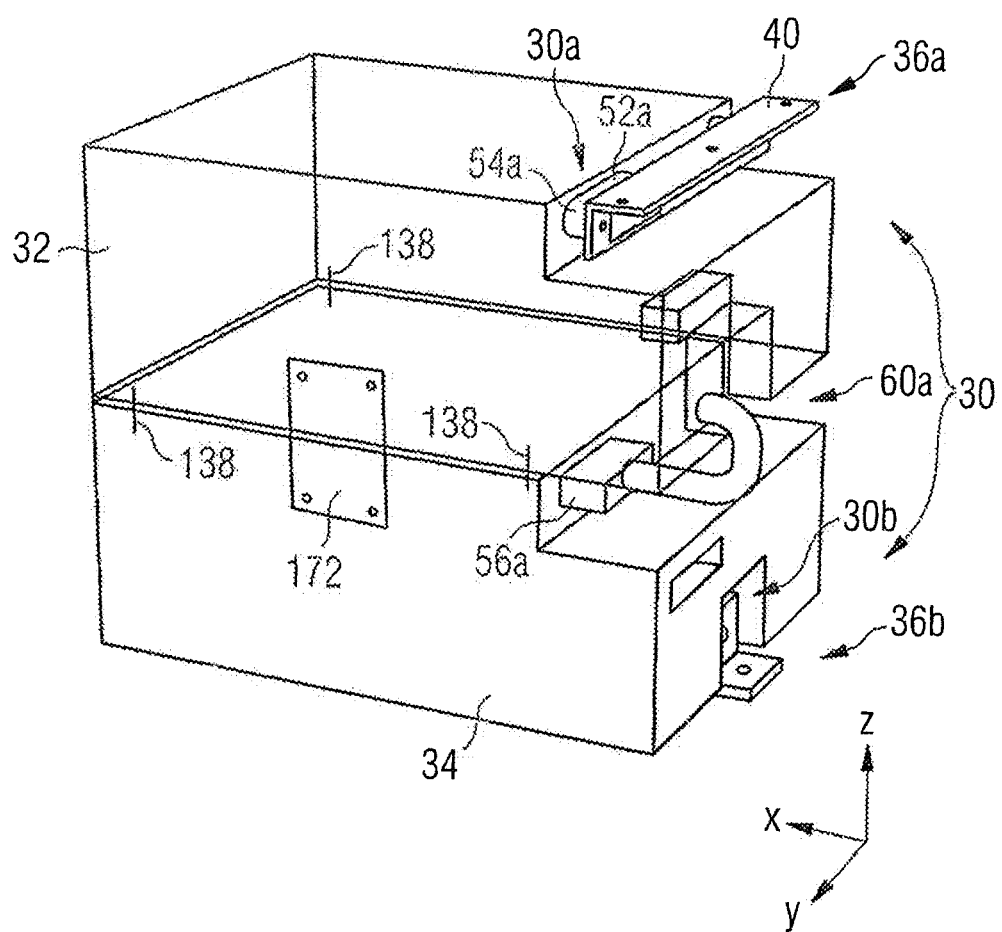
FIG. 13 shows a further embodiment of an interface system for use in an aircraft galley, a part of the interface system being connected to two galley appliances arranged one above the other to form an appliance module.

FIG. 13 shows a further embodiment of an interface system 10, in which the first connection element 30 of the interface system 10 is connected to two galley appliances 32, 34 arranged one above the other to form an appliance module. In order to secure the galley appliances 32, 34 in their position relative to one another in the embodiment shown in FIG. 13, the connecting device 11 of the interface system 10 comprises a fixing plate 172 which is fixed to the first and the second galley appliance 32, 34 and, in the state of the first and the second galley appliance 32, 34 when mounted in the compartment 14 of the aircraft galley, is arranged in the region of lateral surfaces of the first and the second galley appliance 32, 34 facing a lateral surface of the compartment 14.

The first section 30a of the first connection element 30 comprises a first section 52a of an aircraft galley connection device which is directly connected merely to a first section 54a of a first appliance connection device. The first section 60a of the distributor system is designed such that it connects the first section 54a of the first appliance connection device, directly connected to the first section 52a of the aircraft galley connection device, to a first section 56a of a second appliance connection device not directly connected to the first section 52a of the aircraft galley connection device. Similarly, the second section 30b, not illustrated in detail in FIG. 13, of the first connection element 30 comprises a second section of the aircraft galley connection device which is directly connected merely to a second section of the second appliance connection device. The second section of the distributor system is designed such that it connects the second section of the second appliance connection device, directly connected to the second section of the aircraft galley connection device, to a second section of the first appliance connection device not directly connected to the second section of the aircraft galley connection device.

Figure 14:
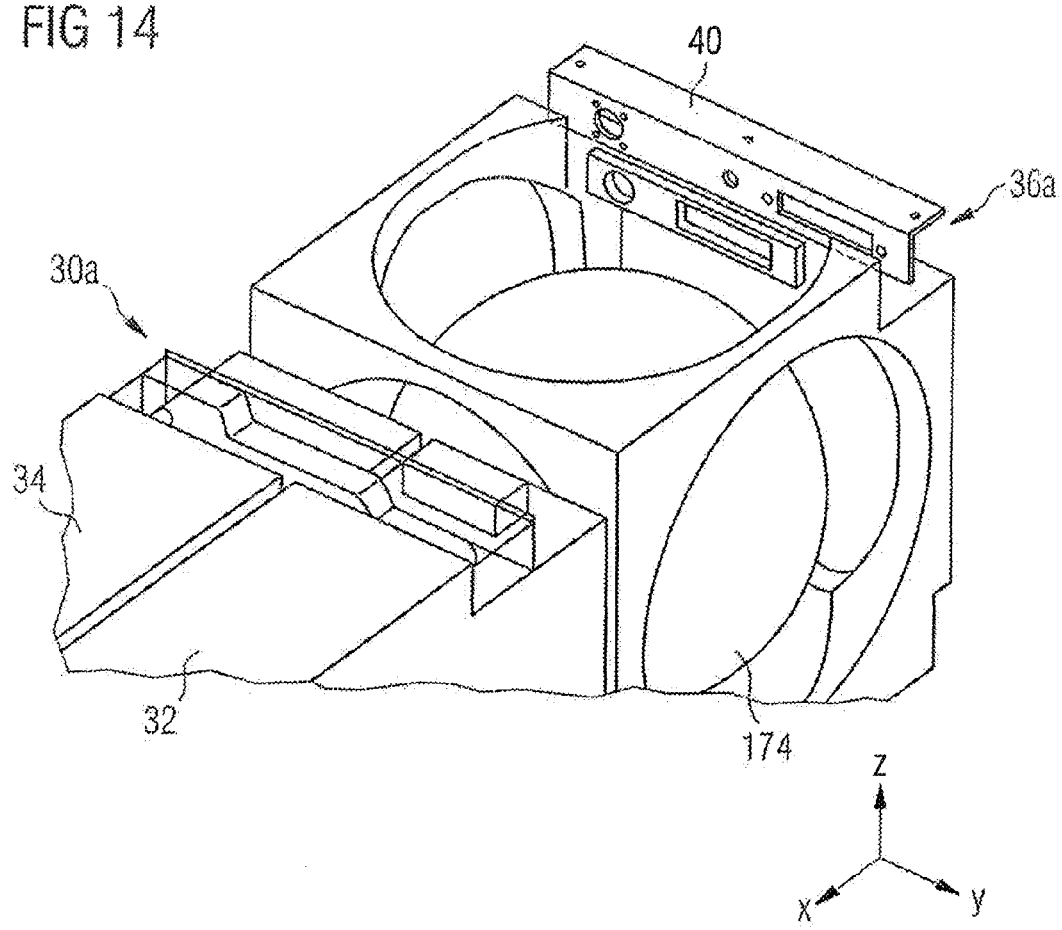
FIG. 14 shows a still further embodiment of an interface system for use in an aircraft galley, a part of the interface system being connected to three galley appliances to form an appliance module.

FIG. 14 shows a further alternative embodiment of an appliance module. In this case, the appliance module comprises three galley appliances 32, 34, 174, the first and the second galley appliances 32, 34 being provided for arrangement one beside the other in a front region of the compartment 14 of the aircraft galley directed towards the compartment opening. The third galley appliance 174, by contrast, is provided for arrangement in a rear region of the compartment 14 directed away from the compartment opening. Such a configuration of the appliance module is preferably suitable for the case where it is not desired or not required to make the third galley appliance 174 directly accessible to a user. For example, the third galley appliance 174 can be a water heater which is configured, inter alia, to draw fresh water from the aircraft galley, heat it and then supply it to the first and the second galley appliances 32, 34. The third galley appliance 174 is arranged in a frame-shaped holding structure 176 which enables the first section 30a of the first connection element 30 to be connected via corresponding lines to the first section 36a of the second connection element 36.

What is claimed is:

1. An interface system for use in an aircraft galley, comprising:

a first connection element which is connectable via a first appliance connection device to an internal electrical system, an internal freshwater supply system, and an internal wastewater disposal system of a first galley appliance, and which is connectable via a second appliance connection device to an internal electrical system, an internal freshwater supply system, and an internal wastewater disposal system of a second galley appliance, and which is connectable via an aircraft galley connection device to a complementary aircraft galley connection device of a second connection element of the interface system, wherein the second connection element is fastenable in a compartment of the aircraft galley, in order to connect the first connection element to an electrical system, a freshwater supply system, and a wastewater disposal system of the aircraft galley, wherein the first connection element further comprises a distributor system which connects the aircraft galley connection device of the first connection element to the first and the second appliance connection devices of the first connection element.

2. The interface system according to claim 1, wherein the distributor system of the first connection element comprises:
a current distributor which connects an electrical connection of the aircraft galley connection device of the first connection element to electrical connections of the first and the second appliance connection devices of the first connection element, and
a freshwater distributor which connects a freshwater connection of the aircraft galley connection device of the first connection element to freshwater connections of the first and the second appliance connection devices of the first connection element, and/or
a wastewater distributor which connects wastewater connections of the first and the second appliance connection devices of the first connection element to a wastewater connection of the aircraft galley connection device of the first connection element.

3. The interface system according to claim 1, wherein the freshwater connections of the first and the second appliance connection devices of the first connection element are arranged in a housing of the first connection element, and in that the wastewater connections of the first and the second appliance connection devices of the first connection element are arranged in a section of the first connection element separate from the housing of the first connection element.

4. The interface system according to claim 1, further comprising:
a connecting device which is configured to secure the first and the second galley appliance in their position relative to one another.

5. The interface system according to claim 4, wherein the connecting device comprises:
a carrier structure receiving the first and the second galley appliance,
a section of a housing of the first connection element to which the first and the second galley appliances are fastenable,
a holding device with a connecting pin which is connectable to the first and the second galley appliances and with a spacer carried by the connecting pin,
a holding strut, to which the first and the second galley appliances are fastenable, the holding strut being arranged in the region of a front side, accessible to a user, of the first and the second galley appliances and extending substantially parallel to a bottom plate of the compartment, when the first and the second galley appliances are mounted in the compartment of the aircraft galley, and
a fixing plate, to which the first and the second galley appliances are fastenable in such a way that the fixing plate is arranged in the region of lateral surfaces of the first and the second galley appliances facing a lateral surface of the compartment, when the first and the second galley appliances are mounted in the compartment of the aircraft galley.

6. The interface system according to claim 1, further comprising:
a mounting system with a first mounting device which is connectable to the first and/or the second galley appliance, and a second mounting device which is complementary to the first mounting device, fastenable in the compartment of the aircraft galley and is configured to cooperate with the first mounting device, in order to secure the first and the second galley appliances in their position relative to the compartment.

7. The interface system according to claim 6, wherein the mounting system comprises:
a first guide rail of the first mounting device which is configured to cooperate with a second guide rail of the second mounting device on the mounting of the galley appliances in the compartment of the aircraft galley and when the galley appliances are mounted in the compartment of the aircraft galley,
a guide projection which extends from the first connection element or from a fixing device for fixing the second connection element in the compartment of the aircraft galley, and is configured to be received in a guide opening complementary to the guide projection and formed in the fixing device for fixing the second connection element in the compartment of the aircraft galley or in the first connection element, and
a first securing device, which is connectable to the first and/or the second galley appliance, of the first mounting device and a second securing device of the second mounting device which is complementary to the first securing device of the first mounting device, the second securing device of the second mounting device being configured to cooperate with the first securing device on the mounting of the galley appliances in the compartment of the aircraft galley, in order to secure the galley appliances in their position in the compartment of the aircraft galley.

8. The interface system according to claim 7, wherein the first securing device of the first mounting device comprises a first latching element spring-biased into its latching position and the second securing device of the second mounting device comprises a second latching element, the first latching element being configured to engage with the second latching element on the mounting of the galley appliances in the compartment of the aircraft galley, when the galley appliances are situated in a desired position in the compartment of the aircraft galley.

9. The interface system according to claim 7, wherein the first securing device of the first mounting device further comprises an actuating element for moving the first latching element between its latching position and its unlatching position, the actuating element being connected to the first latching element, in particular via a connecting element.

10. The interface system according to claim 9, wherein the actuating element is movable between an unactuated position and an actuating position and is configured to keep, in its actuated position, the first latching element in its latching position or its unlatching position.

11. The interface system according to claim 9, wherein the actuating element extends in its actuating position at an angle of 30 to 90° to a lateral surface of the first and/or the second galley appliance when the first securing device of the first mounting device is connected to the first and/or the second galley appliance, and/or in that the actuating element extends in its unactuated position substantially parallel to the front side of the first and/or the second galley appliance when the first securing device of the first mounting device is connected to the first and/or the second galley appliance.

12. An appliance module for an aircraft galley, comprising:
a first galley appliance;
a second galley appliance; and
a first connection element connecting the first and second galley appliances, the first connection element connected via a first appliance connection device to an internal electrical system, an internal freshwater supply system, and an internal wastewater disposal system of the first galley appliance, the first connection element connected via a second appliance connection device to an internal electrical system, an internal freshwater supply system, and a internal wastewater disposal system of the second galley appliance,
wherein the first connection element is connected via an aircraft galley connection device to a complementary aircraft galley connection device of a second connection element, which second connection element is fastened in a compartment of the aircraft galley, in order to connect the first connection element to an electrical system, a freshwater supply system, and a wastewater disposal system of the aircraft galley,
wherein the first connection element further comprises a distributor system which connects the aircraft galley connection device of the first connection element to the first and the second appliance connection devices of the first connection element.

13. The appliance module according to claim 12, wherein the first and the second galley appliances are arranged beside, above or behind one another in relation to a longitudinal axis.

14. A method for mounting a first galley appliance and a second galley appliance in an aircraft galley using an interface system including a first connection element and a second connection element, the first connection element having an aircraft galley connection device, a first appliance connection device, and a second appliance connection device, the second connection element having an aircraft galley connection device, the method having the steps:
connecting the first galley appliance and the second galley appliance to the first connection element of the interface system,
fixing the second connection element of the interface system in a compartment of the aircraft galley,
introducing the galley appliances, connected to the first connection element of the interface system, into the compartment of the aircraft galley, and
connecting the aircraft galley connection device of the first connection element of the interface system to the aircraft galley connection device of the second connection element of the interface system, in order to connect the first connection element to an electrical system, a freshwater supply system, and a wastewater disposal system of the aircraft galley, a distributor system of the first connection element connecting the aircraft galley connection device of the first connection element to the first and the second appliance connection devices of the first connection element.

15. The method according to claim 14, wherein the first and the second galley appliances are secured in their position relative to one another by a connecting device before the galley appliances are introduced into the compartment of the aircraft galley.

* * * * *